United States Patent
Thapliya et al.

(10) Patent No.: US 8,200,052 B2
(45) Date of Patent: Jun. 12, 2012

(54) OPTICAL DEVICE AND MULTIPLE BEAM SCANNER

(75) Inventors: Roshan Thapliya, Kanagawa (JP);
Shigetoshi Nakamura, Kanagawa (JP);
Takashi Kikuchi, Kanagawa (JP);
Kazuhiro Hayashi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 236 days.

(21) Appl. No.: 12/617,173

(22) Filed: Nov. 12, 2009

(65) Prior Publication Data
US 2010/0265503 A1    Oct. 21, 2010

(30) Foreign Application Priority Data
Apr. 21, 2009 (JP) ................................. 2009-102996

(51) Int. Cl.
*G02B 6/12* (2006.01)
(52) U.S. Cl. .......................................... 385/14; 385/129
(58) Field of Classification Search ................. 385/1–3, 385/14, 129–132
See application file for complete search history.

(56) References Cited

U.S. PATENT DOCUMENTS
7,693,355 B2 *   4/2010   Peyghambarian et al. ........ 385/2
7,713,428 B2 *   5/2010   Li et al. ............................ 216/24

FOREIGN PATENT DOCUMENTS
JP    A-7-181532    7/1995
JP    A-2007-47534  2/2007

* cited by examiner

*Primary Examiner* — Sarah Hahm
(74) *Attorney, Agent, or Firm* — Oliff & Berridge, PLC

(57) ABSTRACT

There is provided an optical device including: a passive core layer in which is formed an optical circuit having a refractive index n2; an active core layer covering at least a portion of the optical circuit, exhibiting an electro-optical effect, and having a refractive index of n1 higher than n2; a lower clad layer over which the passive core layer is formed and having a refractive index n3 lower than n2; an upper clad layer covering the active and passive core layers and having a refractive index n5 lower than n1; a lower electrode disposed below the lower clad layer; and an upper electrode disposed on the upper clad layer, in which the entrance and exit portions of the active core layer are tapered, respectively.

12 Claims, 25 Drawing Sheets

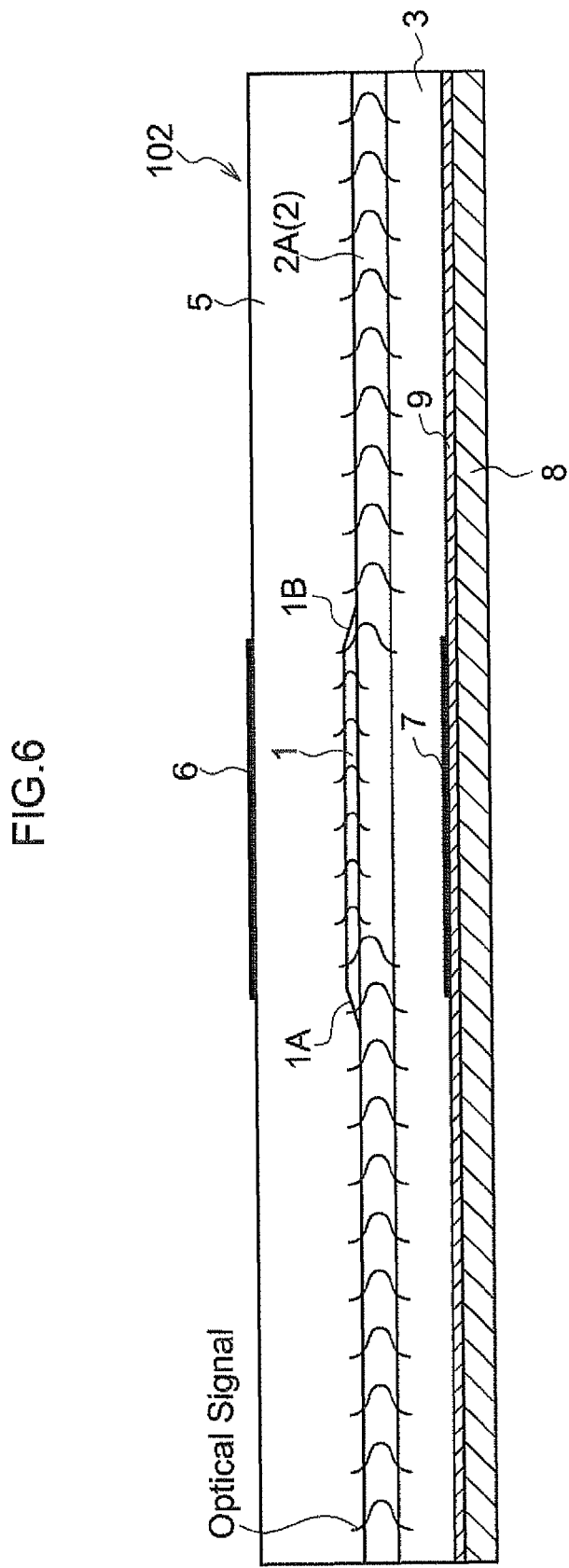

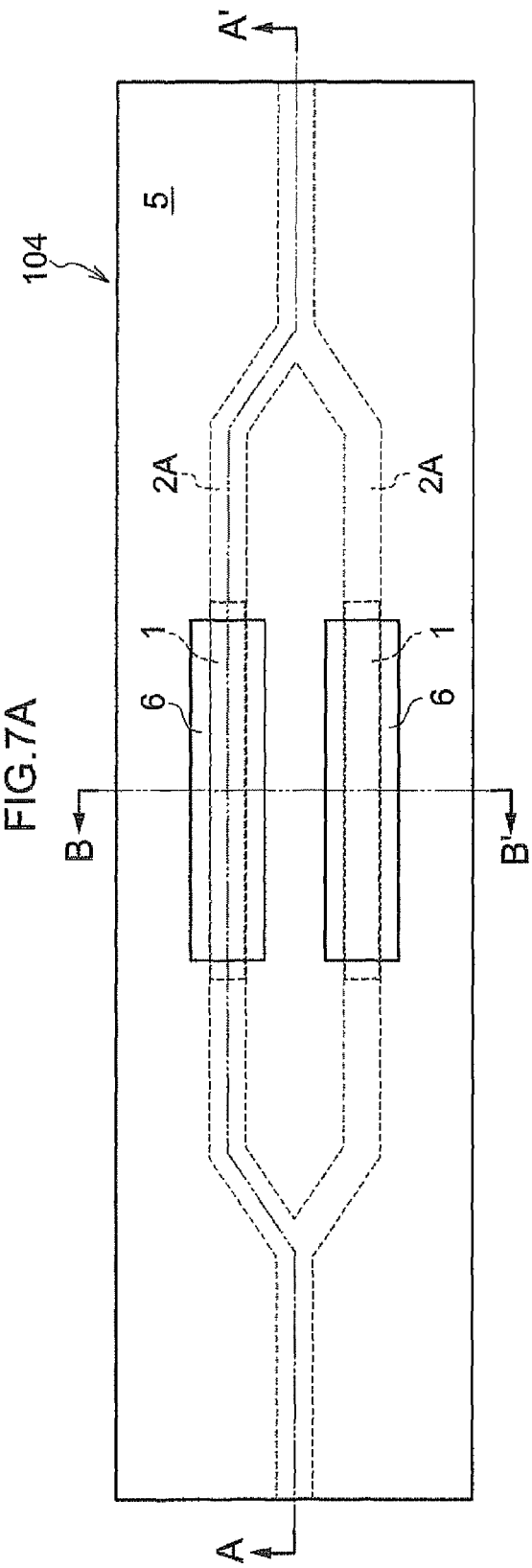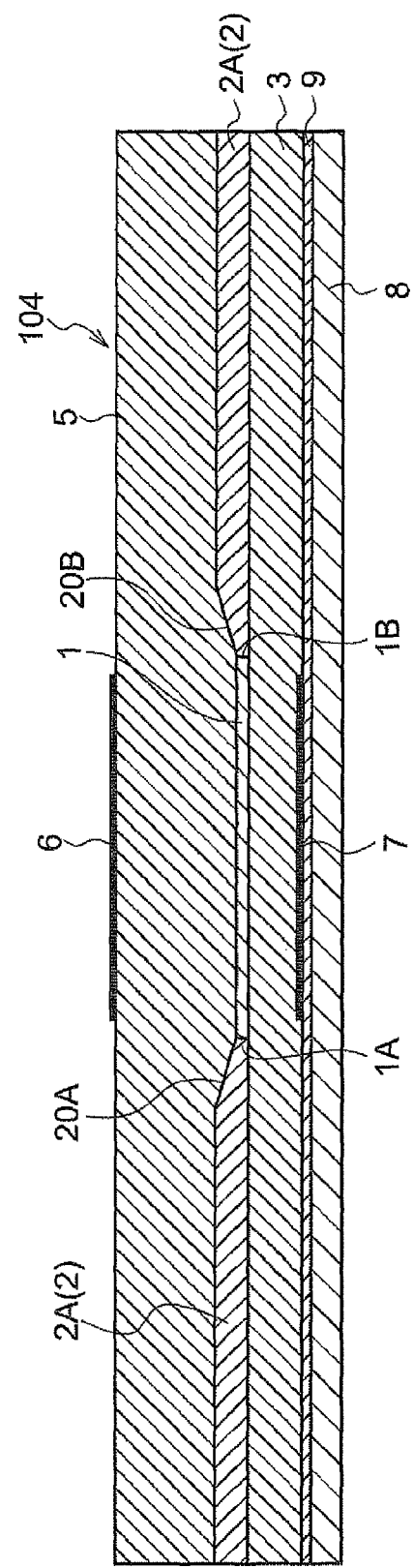

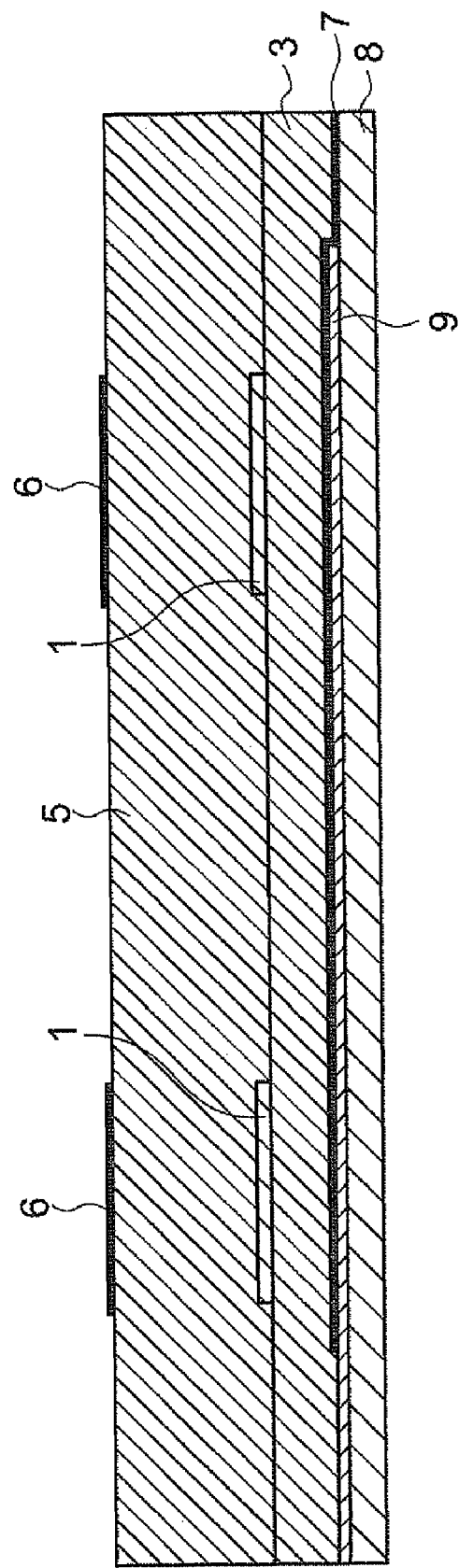

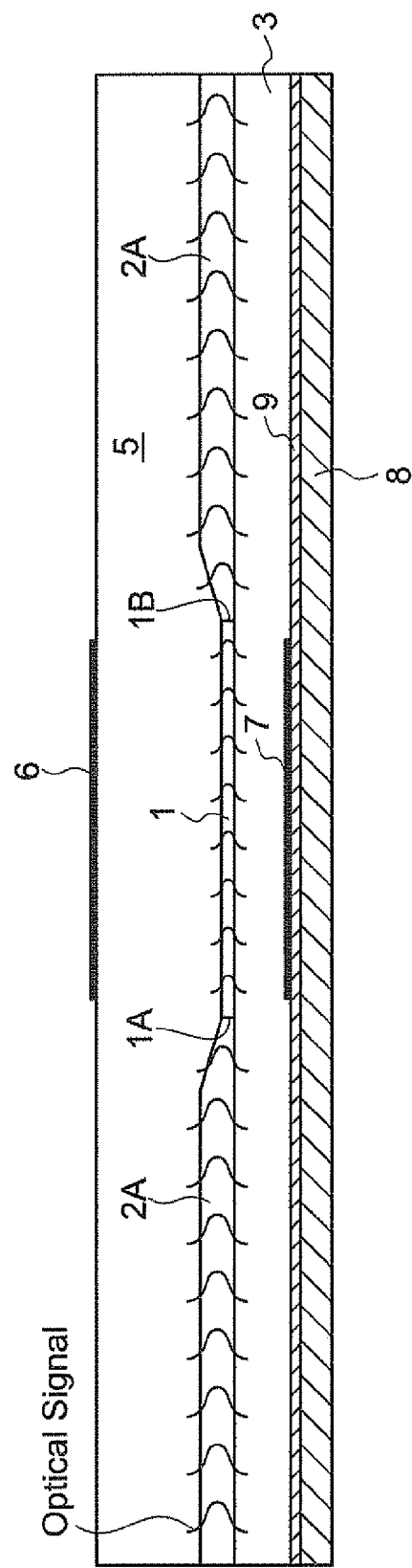

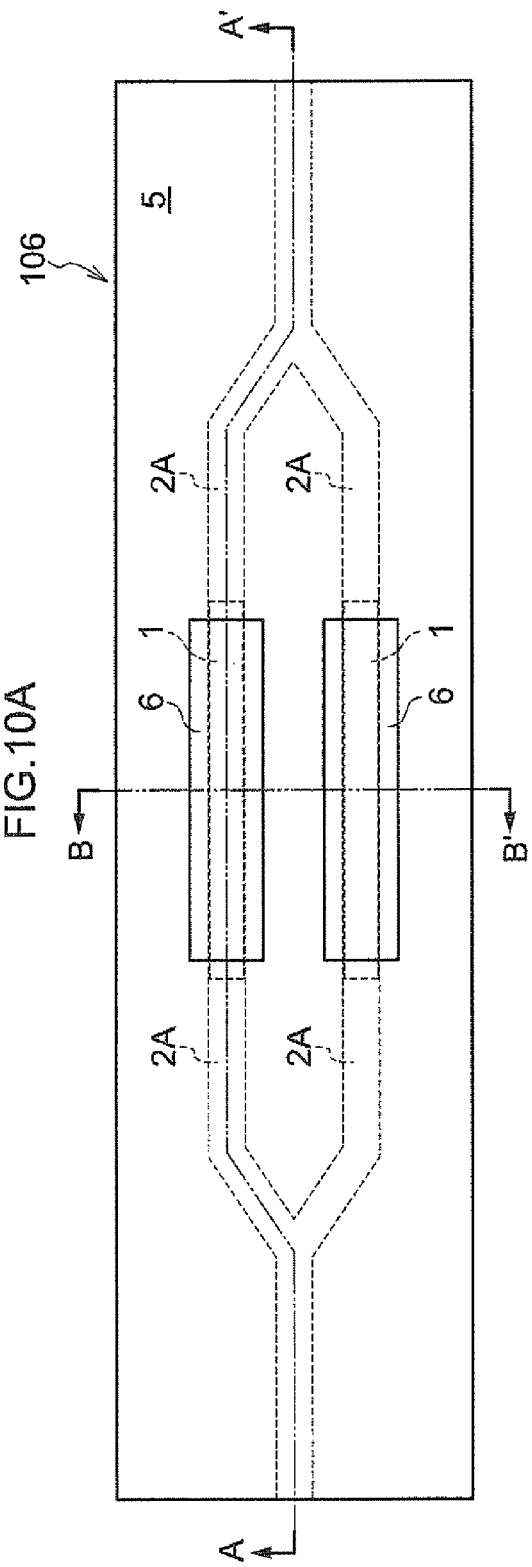
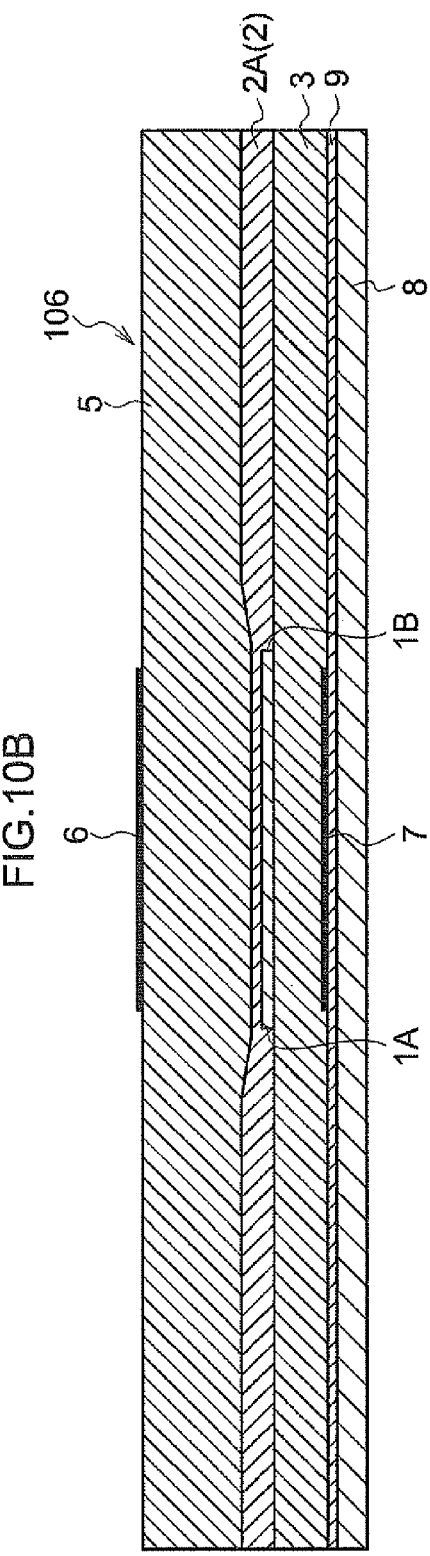

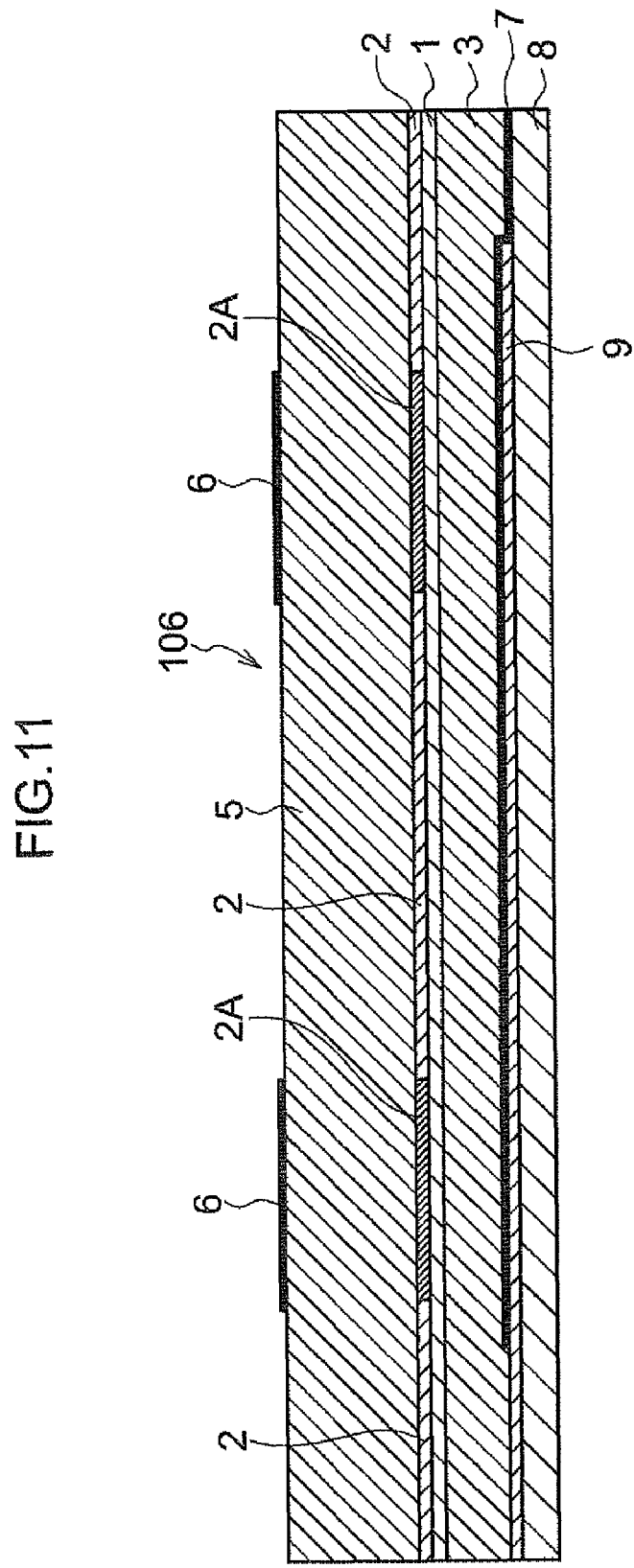

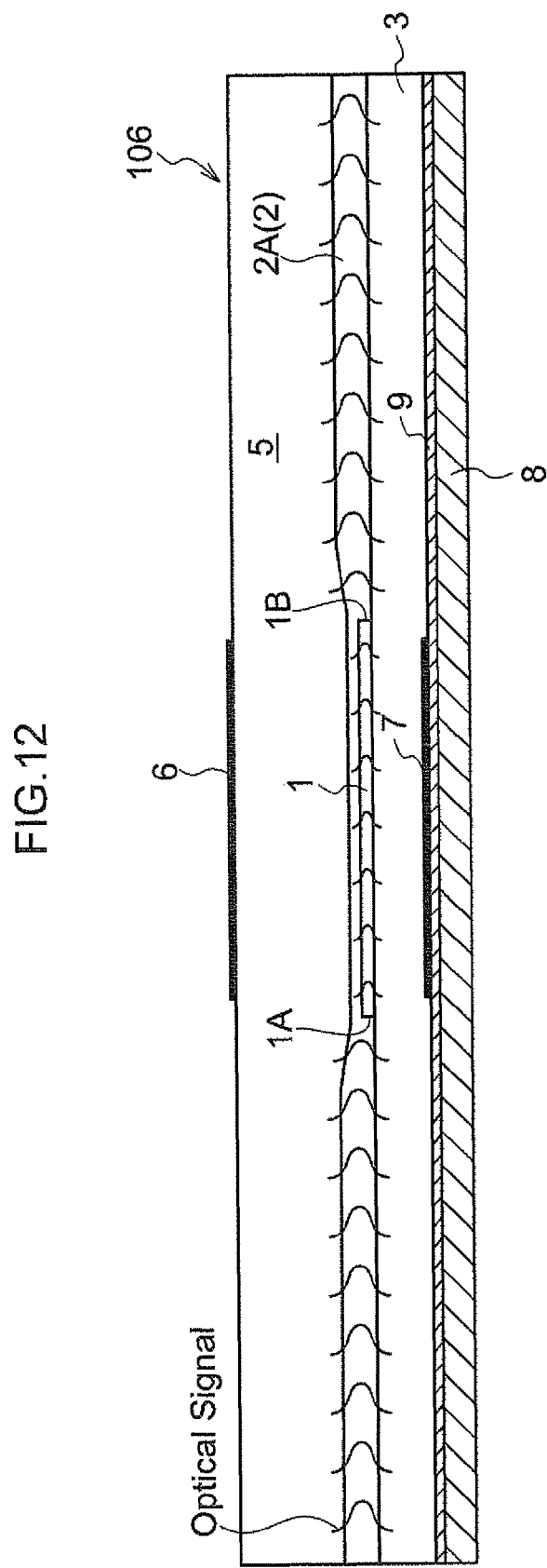

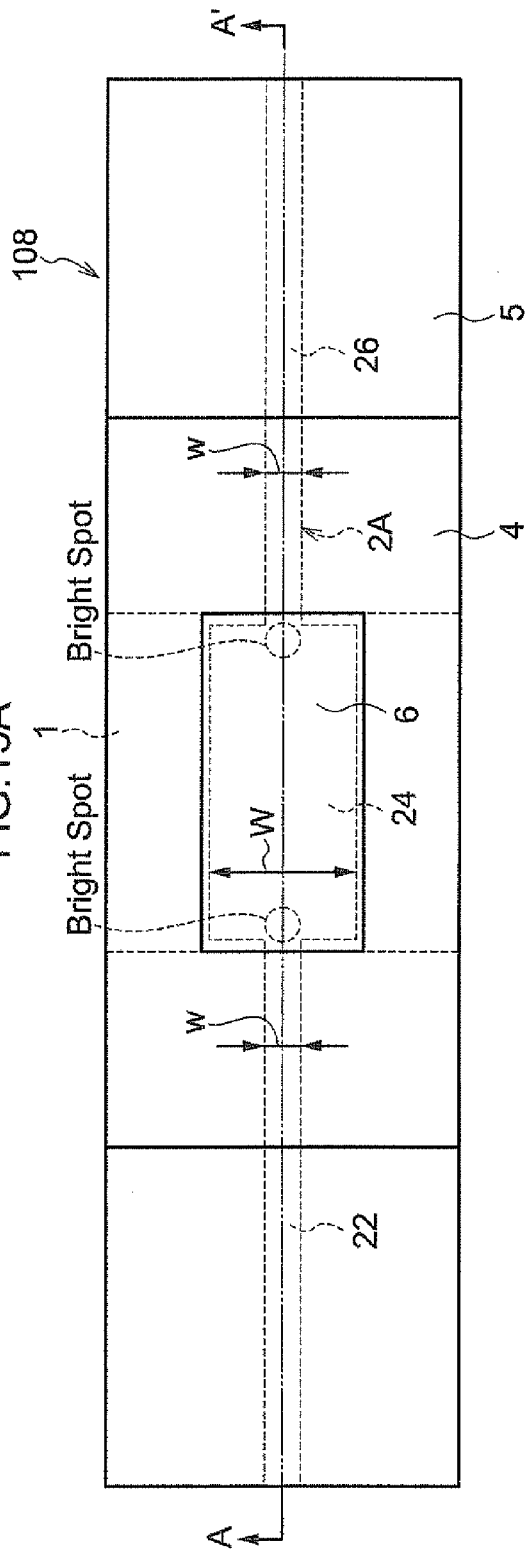
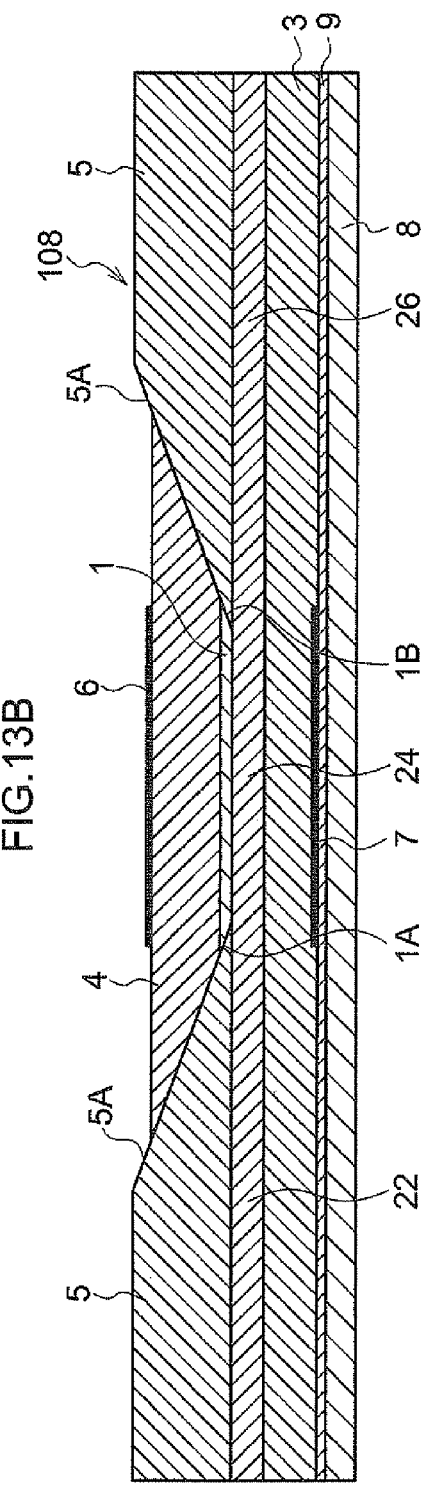
FIG.13A
FIG.13B

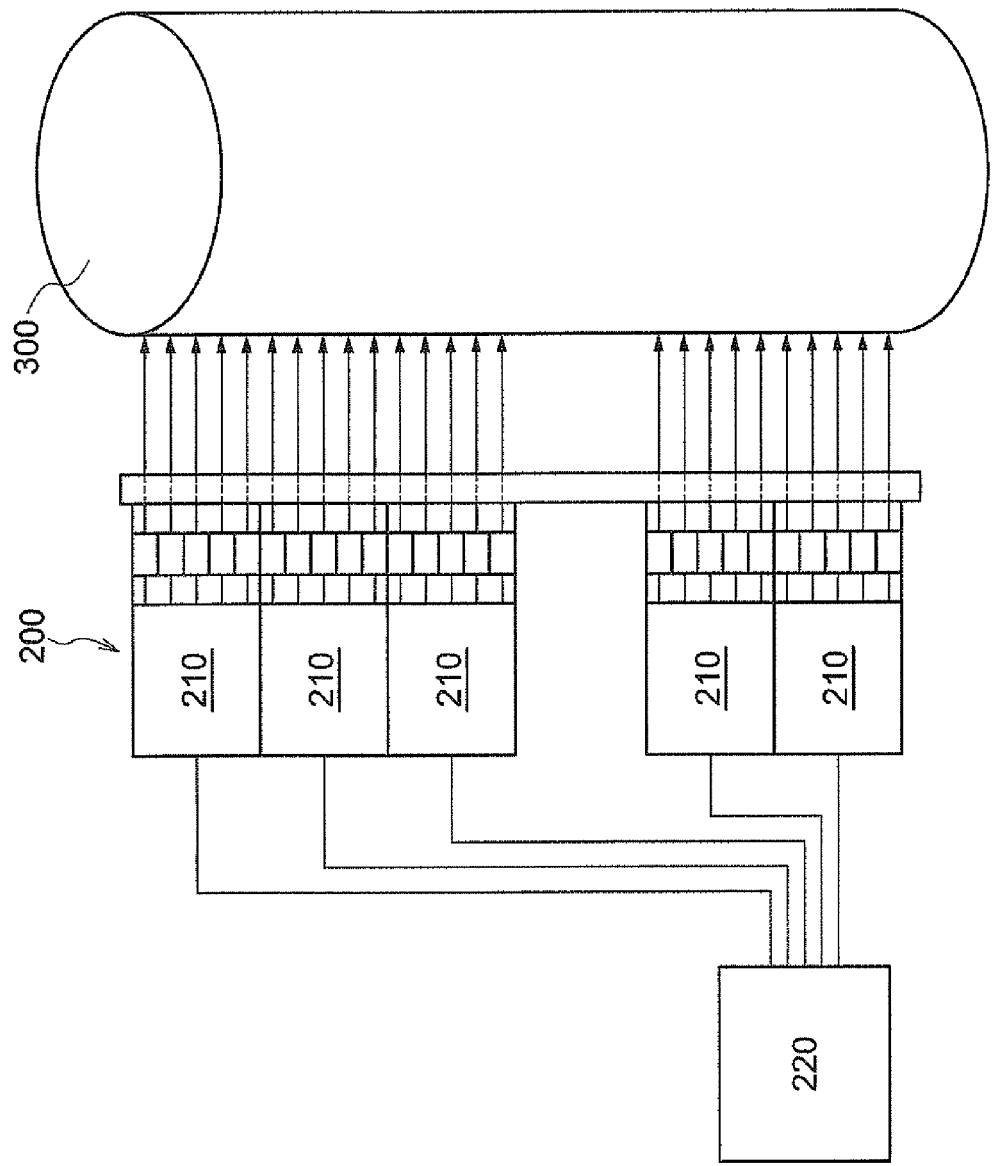

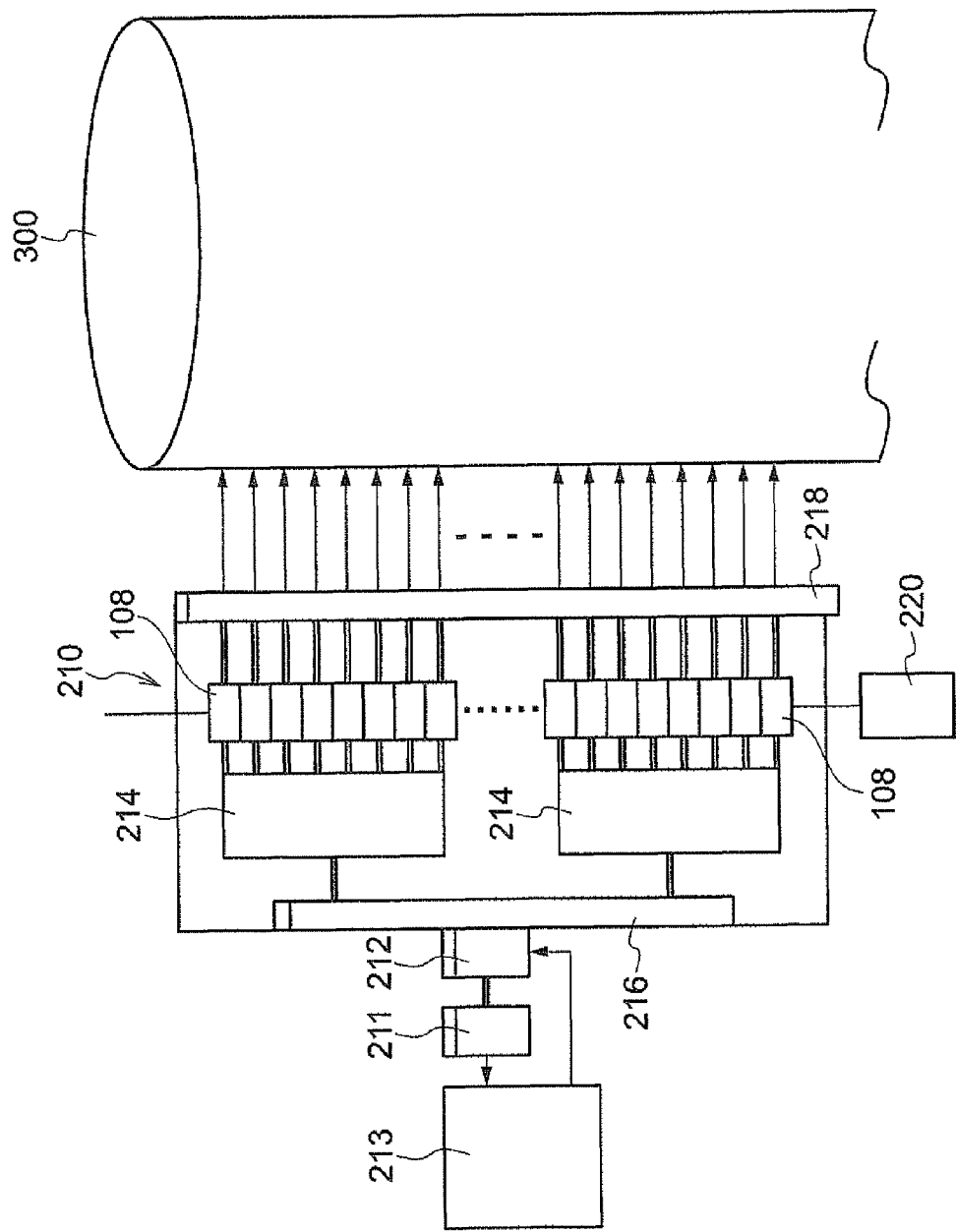

OPTICAL DEVICE AND MULTIPLE BEAM SCANNER

CROSS-REFERENCE TO RELATED APPLICATION

This application claims priority under 35 USC 119 from Japanese Patent Application No. 2009-102996 filed on Apr. 21, 2009.

TECHNICAL FIELD

This invention relates to an optical device and a multiple beam scanner.

RELATED ART

An optical device can provide useful functions such as modulation, switching, or signal attenuation.

An optical device is conventionally formed by sandwiching a core layer between an upper clad layer and a lower clad layer and employing a rib structure for lateral confinement. The core is made of an electro-optical material, which typically has a higher refractive index than the clad materials.

SUMMARY

According to an aspect of the invention, there is provided an optical device including: a passive core layer in which an optical circuit having a refractive index n2 that is higher than the refractive index of rest part thereof is formed; an active core layer covering at least a portion of the optical circuit, exhibiting an electro-optical effect, and having a refractive index of n1 that is higher than the refractive index n2 of the optical circuit; a lower clad layer over which the passive core layer is formed and having a refractive index n3 that is lower than the refractive index n2 of the optical circuit; an upper clad layer covering the active and passive core layers and having a refractive index n5 that is lower than the refractive index n1 of the active core layer; a lower electrode disposed below the lower clad layer; and an upper electrode disposed on the upper clad layer, wherein the entrance and exit portions of the active core layer are tapered, respectively.

BRIEF DESCRIPTION OF THE DRAWINGS

Exemplary embodiments of the present invention will be described in detail based on the following figures, wherein:

FIG. 6 is a schematic view of the optical device of the second embodiment showing the operation thereof;

FIG. 7A is a plan view of an optical device of a third embodiment and FIG. 7B is a sectional view thereof sectioned along line A-A';

FIG. 8 is a sectional view of the optical device of the third embodiment along line B-B' in FIG. 7;

FIG. 9 is a schematic view of the optical device of the third embodiment showing the operation thereof;

FIG. 10A is a plan view of an optical device of a fourth embodiment and FIG. 10B is a sectional view thereof sectioned along line A-A';

FIG. 11 is a sectional view of the optical device of the fourth embodiment along line B-B' in FIG. 11;

FIG. 12 is a schematic view of the optical device of the fourth embodiment showing the operation thereof;

FIG. 13A is a plan view of an optical device of a fifth embodiment and FIG. 13B is a sectional view thereof sectioned along line A-A';

FIG. 14 is a schematic view showing an overall configuration of a multi beam scanner of a sixth embodiment;

FIG. 15 is a schematic view showing an example of a configuration of the electro-optical scanning unit of the multi beam scanner of a sixth embodiment;

DETAILED DESCRIPTION

1. First Embodiment

An optical device of a first embodiment of the present invention is described below.

Figure 1A:
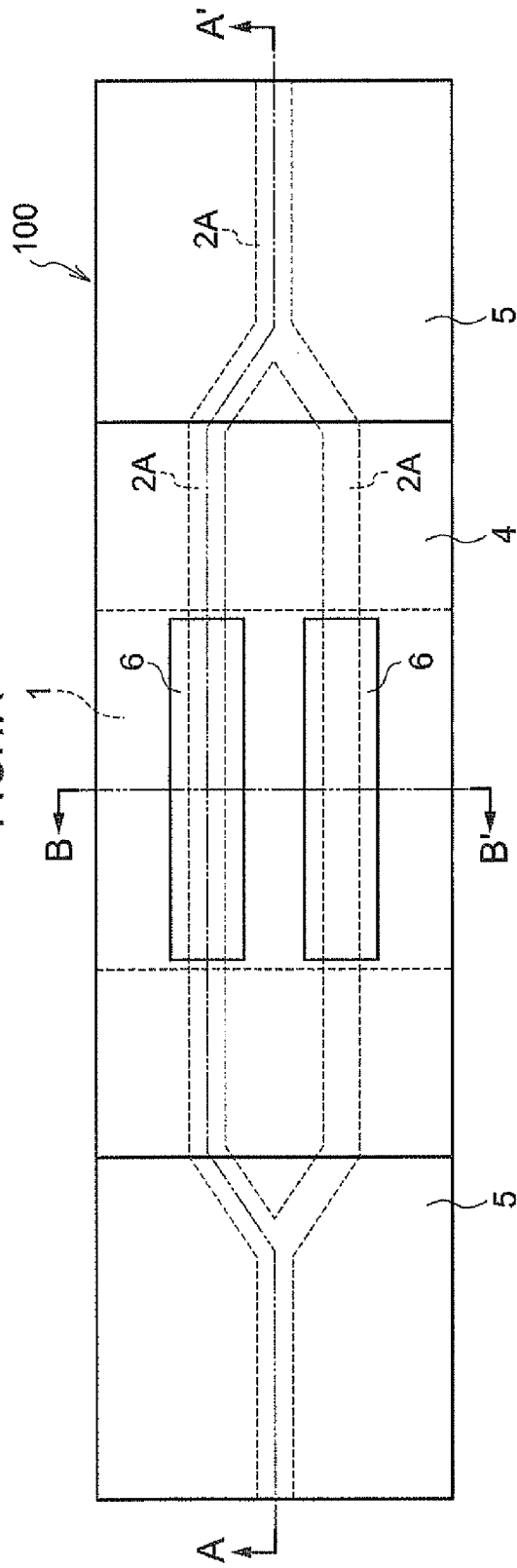
FIG. 1A is a plan view of an optical device of a first embodiment and FIG. 1B is a sectional view thereof sectioned along line A-A'.
Figure 1B:
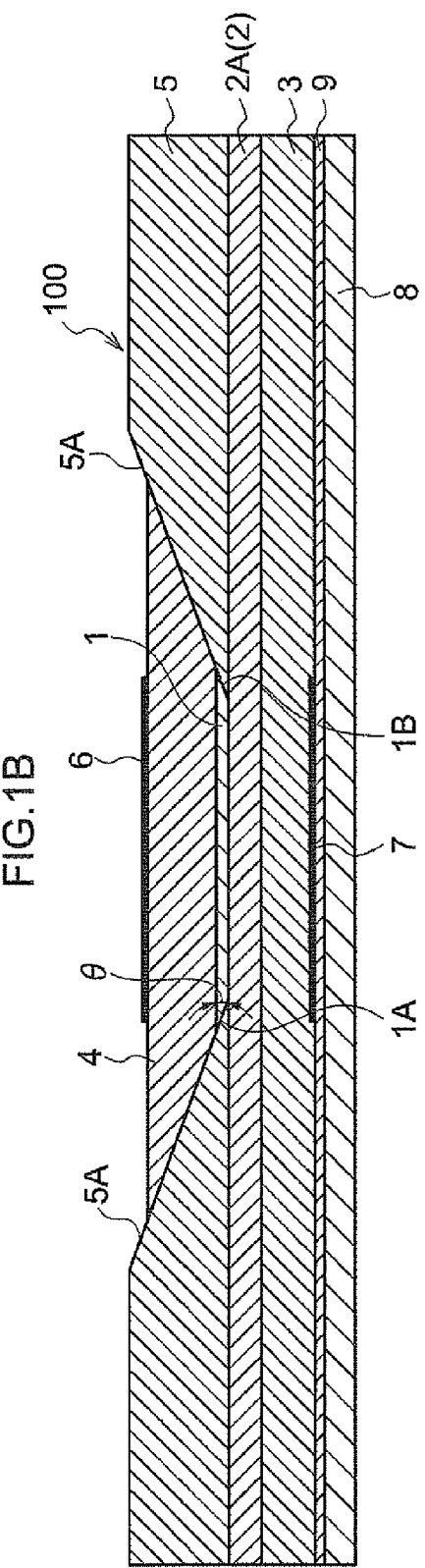

FIG. 1A is a plan view of the optical device 100 of the first embodiment and FIG. 1B is a sectional view thereof sectioned along line A-A' in FIG. 1A.

Figure 2:
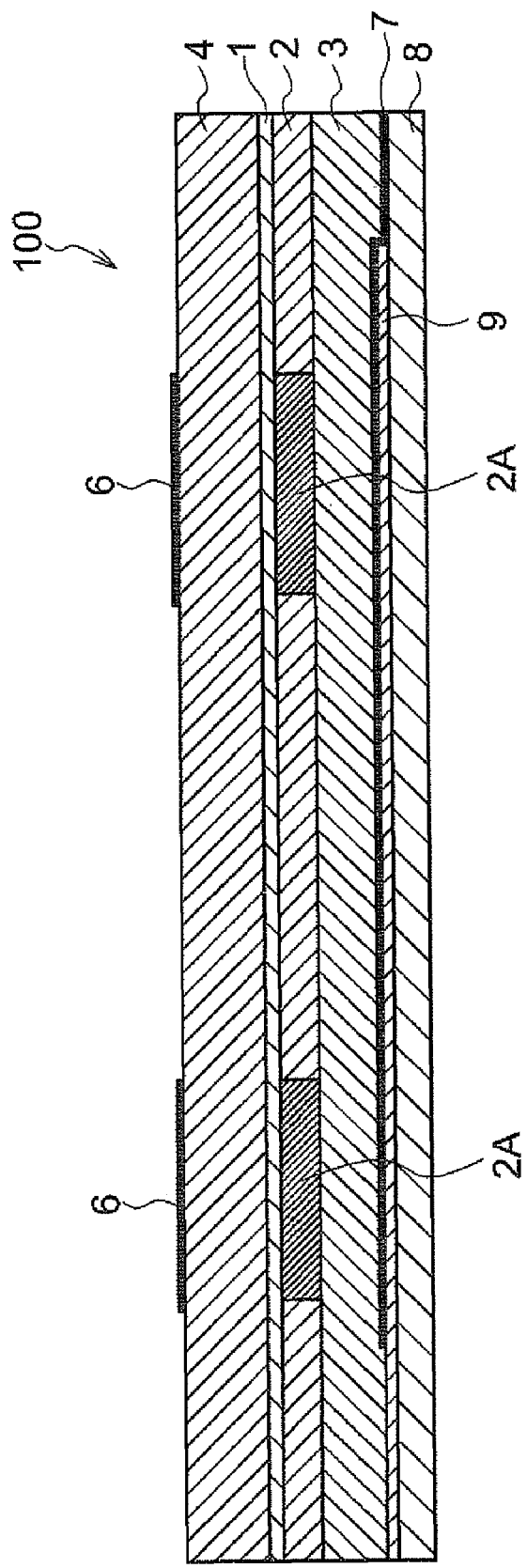
FIG. 2 is a sectional view of the optical device of the first embodiment along line B-B' in FIG. 1.

As shown by FIGS. 1A, 1B, and 2, an optical device 100 includes a passive core layer 2 and an active core layer 1 above the passive core layer 2.

An optical circuit 2A such as a Mach-Zender type optical circuit is formed in the passive core layer 2. The optical circuit 2A has a refractive index n2 that is higher than the refractive index of the rest part of the passive core layer 2.

The active core layer 1 is disposed across the whole width of the optical device 100 so as to cover a portion of the passive core layer 2. The active core layer 1 has a refractive index n1 that is higher than the refractive index n2 of the optical circuit 2A and possesses an electro-optical property, namely, that the refractive index n1 changes in accordance with the intensity of electric field applied to the optical device 100.

The passive core layer 2 is formed above a lower clad layer 3 having a refractive index n3 lower than the refractive index n2.

The active core layer 1 is covered by an upper buffer layer 4 having a refractive index n4 that is lower than the refractive index n1 of the active core layer 1.

The portion of the passive core layer 2 except the portion thereof on which the active core layer 1 is disposed is covered by an upper clad layer 5 having a refractive index n5 that is lower than the refractive index n1 but equal to or greater than the refractive index n4.

Over the upper buffer layer 4, a pair of upper electrodes 6 is disposed such that each electrode is positioned over a branch portion of the optical circuit 2A.

The lower clad layer 3 is located over a substrate 8 that includes Si. Between the lower substrate 3 and the substrate 8, a lower buffer layer 9 is located. A lower electrode 7 is provided between the lower clad layer 3 and the lower buffer layer 9.

As shown in FIG. 1B, a tapered structure 5A is formed at the upper clad layer 5, and at the bottom of the tapered structure 5A, the active core layer 1 is formed. Accordingly, edge portions of the active core layer 1, namely, the entrance portion 1A and the exit portion 1B, are tapered, respectively.

Over the active core layer 1, the tapered structure 5A is filled by the upper buffer layer 4.

As shown in FIG. 1B, the wedge angle θ of the both wedge portions of the active core portion 1 is 0.1 to 1 degrees, and more preferably, 0.1 to 0.2 degrees. By setting the wedge angle θ of the active core portion 1 in the above range, an optical signal transmitted through the optical circuit 2A in the passive core layer 2 is smoothly introduced into the active core layer 1 and after being transmitted through the active core layer 1, the optical signal smoothly returns to the optical circuit 2A. Accordingly, coupling loss and propagation loss between the optical circuit 2A and the active core layer 1 are reduced drastically compared with a conventional optical device.

The thickness of the active core layer 1 is typically from 0.1 to 1 μm, preferably 0.3 to 0.8 μm, and more preferably 0.5 to 0.7 μm.

The passive core layer 2 typically has a thickness of 2 to 10 μm, preferably 2 to 7 μm, and more preferably 3 to 4 μm.

The lower clad layer 3 and the upper clad layer 5 typically each have a thickness of 1 to 20 μm, preferably 5 to 15 μm, and more preferably 3 to 10 μm.

The thickness of the upper buffer layer 4 is typically 1 to 20 μm, preferably 5 to 15 μm, and more preferably 3 to 10 μm. The thickness of the upper buffer layer 4 can be the same or less than that of the upper clad layer 5.

The active core layer 1 can be formed of materials such as a binding polymer in which a low molecular weight compound having an electro-optical effect is dispersed, and a polymer having an electro-optical effect.

The following polymers can be exemplified as the binding polymer:
a poly(metha)acrylate resin, a polyimide resin, a polyetherimide resin, a polycarbonate resin, a polyethylene telephthalate resin, a polysulfone resin, a polyethersulfone resin, a polyurethane resin, and a polyimide resin.

Among the above polymers, a polyimide resin, a polyetherimide resin, a polycarbonate resin, and a polysulfone resin are preferable because these polymers have not only excellent solubility with respect to a specific solvent but also excellent resistance to a common solvent.

The low molecular weight compound that can be incorporated into the binding polymer includes azo pigments such as Disperse Red 1 (DR1), 2-methyl-6-(4-N,N-dimethylaminobenzylidene)-4H-pyrane-4-iridenepropanyl, and 4-{[4-(dimethylamino)phenyl]imino}-2,5-cyclohexadiene-1-on.

The polymer having an electro-optical effect includes poly [(methylmethacrylate)-Co-(DR1 acrylate)] (Aldrich Co.)

The active core layer 1 can be formed by coating a solution of a material selected from the above groups on the passive core layer 2 to a predetermined thickness, and then curing or drying the solution. Processes such as a spin-coating process, a dip-coating process, a spray-coating process, and a printing coating process can be employed for coating the solution. Prior to coating the solution, a protective coating can be formed on the passive core layer 2, if necessary.

The passive core layer 2 can be formed of a binding resin into which a reagent having photo-reactivity, in other words, having a refractive index that can be changed by photo-exposure, is incorporated.

The binding resins used for forming the passive core layer 2 can be selected from the same group of polymers mentioned above.

The reagent may include a single compound or a combination of a plurality of compounds. DNQ (diazo-naphtoquinone) is included in the single compounds that can be used as the reagent. The combination of a plurality of compounds includes a combination of an acrylic ester and a derivative of α-hydroxy ketone and a combination of an epoxide compound and an aromatic sulfonium salt.

The passive core layer 2 can be formed by coating a solution of the binding resin incorporated with the reagent or coating a fused binding polymer incorporated with the reagent on the lower clad layer 3 by a similar process to that employed for forming the active core layer 1.

Then, the passive core layer 2 is exposed in a predetermined pattern to form the optical circuit 2A.

The materials that can be used to form the lower clad layer 3, upper clad layer 5, and the upper buffer layer 4 include a polyimide resin, a fluoride containing a polyimide resin, a photo curing polyacrylate resin, and epoxy resin.

The optical device 100 can be produced by the process shown in FIGS. 17A to 19C.

Figure 17A:
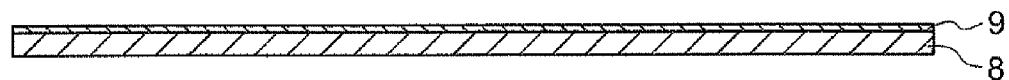
FIG. 17A to FIG. 17D are process charts showing the initial part of a process for producing the optical device of the first embodiment.
Figure 17B:
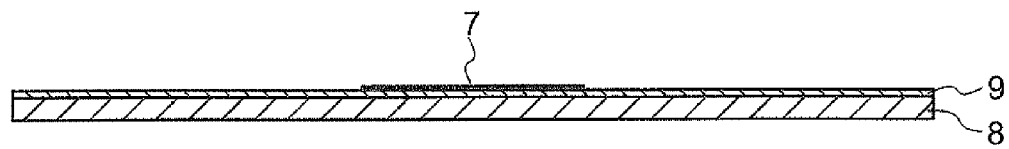
Figure 17C:
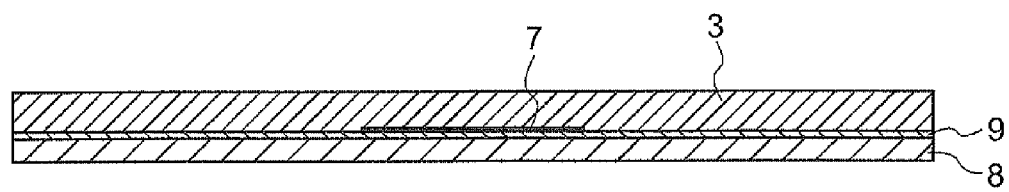
Figure 17D:
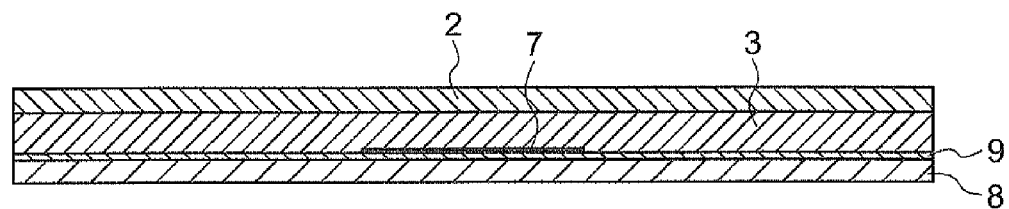

Firstly, the lower buffer layer 9 is formed over the substrate 8 (FIG. 17A), and the lower electrode 7 is formed on the lower buffer layer 9 (FIG. 17B). Then, the lower buffer layer 9 and the lower electrode 7 are covered by the lower clad layer 3 (FIG. 17C) and the passive core layer 2 is formed over the lower clad layer 3 (FIG. 17D).

Figure 18A:
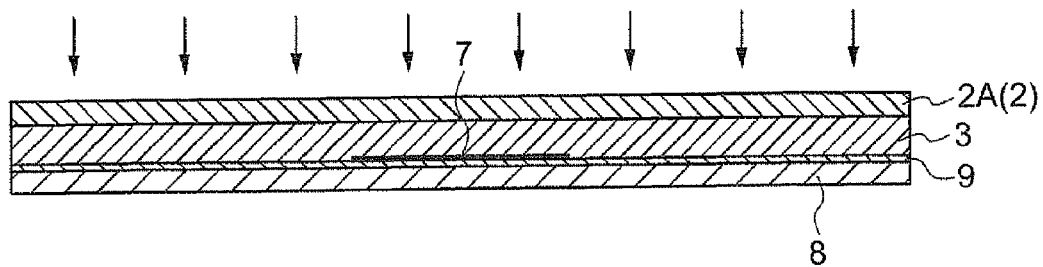
FIG. 18A to FIG. 18C are process charts showing the intermediate part of the process for producing the optical device of the first embodiment.
Figure 18B:
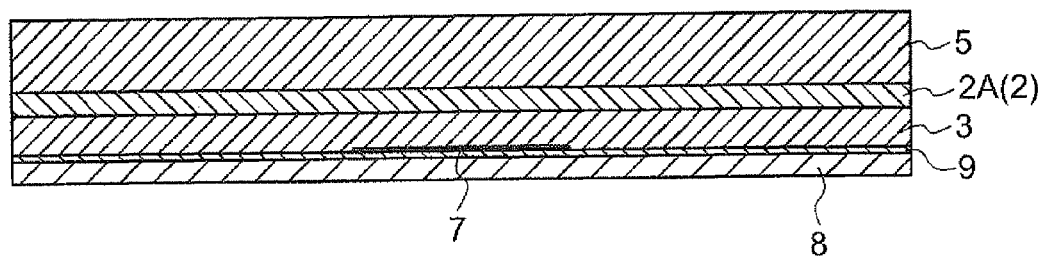
Figure 18C:
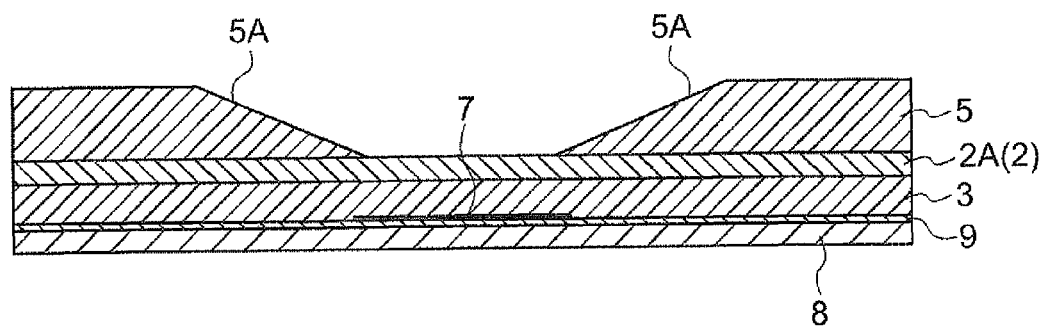

Then, the passive core layer 2 is exposed in a predetermined pattern to form the optical circuit 2A (FIG. 18A). After the optical circuit 2A is formed in the passive core layer 2, the upper clad layer 5 is formed over the passive core layer 2 and the optical circuit 2As (FIG. 18B). Then, the upper clad layer 5 is etched to form the tapered structure 5As (FIG. 18C).

Figure 19A:
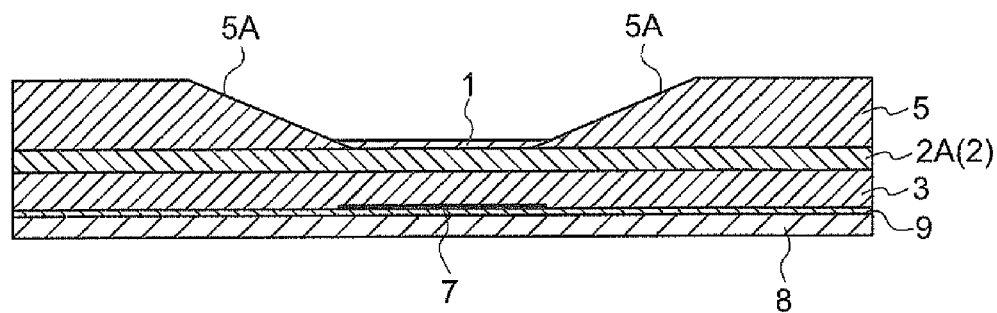
FIG. 19A to FIG. 19C are process charts showing the end part of the process for producing the optical device of the first embodiment.
Figure 19B:
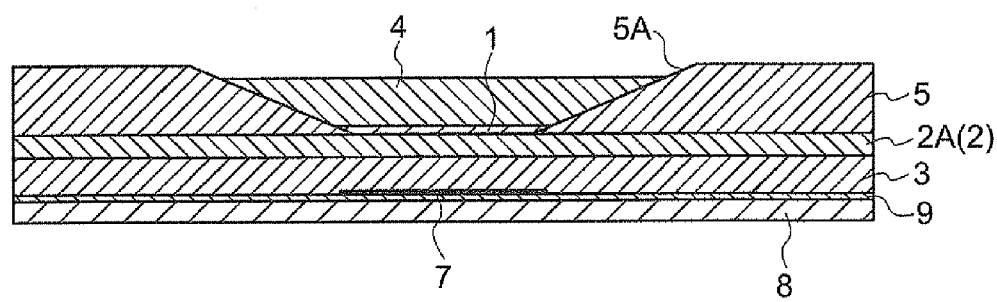
Figure 19C:
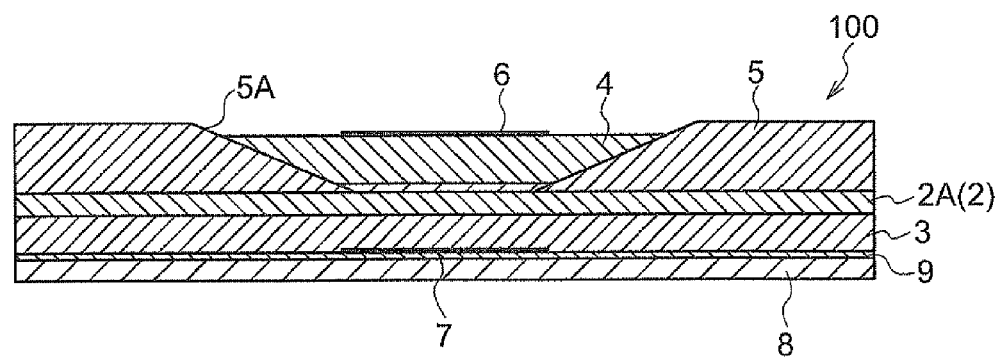

The active core layer 1 is formed at the bottom of the tapered structure 5A (FIG. 19A), and the remaining portions of the tapered structure 5A is filled by the upper buffer layer 4 (FIG. 19B). Over the upper buffer layer 4, the upper electrode 6 is formed (FIG. 19C).

Then, the obtained multi-layer structure is heated so that the active core layer 1 is molten or softened, and a high direct voltage is applied between the upper electrode 6 and the lower electrode 7. While applying the high voltage between the upper electrode 6 and the lower electrode 7, the obtained multi-layer structure is left to be cooled to room temperature so as to polarize the active core layer 1.

The operation of the optical device 100 is described below.

Figure 3:
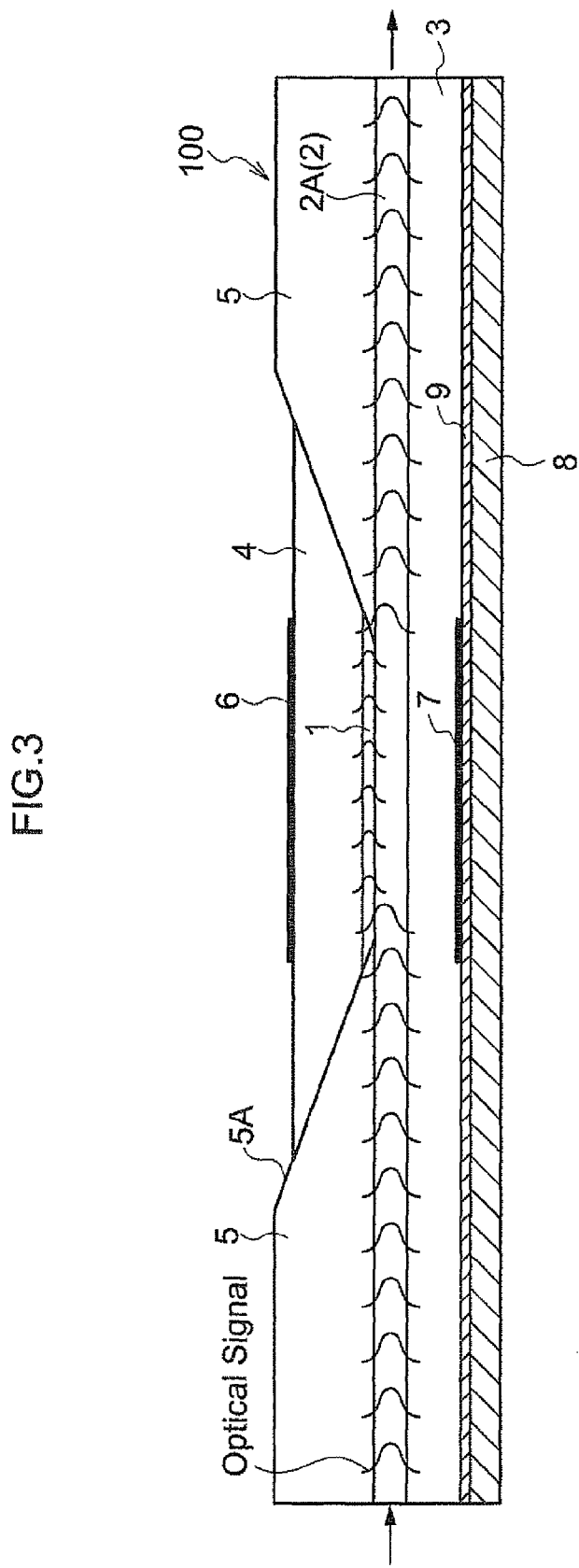
FIG. 3 is a schematic view of the optical device of the first embodiment showing the operation thereof.

As shown in FIG. 3, an optical signal led into the optical circuit 2A is transmitted in the optical circuit 2A because the optical circuit 2A has the refractive index n2 that is higher than the refractive index of the passive core layer 2 outside the optical circuit 2A, the refractive index n3 of the lower clad layer 3 and the refractive index n5 of the upper clad layer 5.

At the entrance portion 1A of the active core layer 1, because the refractive index n1 of the active core layer 1 is higher than the refractive index n2 of the optical circuit 2A and the optical signal is transmitted slower in the active core layer 1 compared with the optical circuit 2A, the path of the optical signal is bent upward and the optical signal is led into the active core layer 1.

In addition, the refractive index n4 of the upper buffer layer 4 is lower than the refractive index n1, and accordingly, the optical signal is transmitted faster in the upper buffer layer 4 than in the active core layer 1. Thus, the path of the optical signal that is once bent upward toward the active core layer 1 is then bent downward and the optical signal is led into the active core layer 1.

At the outlet portion 1B of the active core layer 1, the optical signal is transmitted faster in the optical circuit 2A than in the active core layer 1, and thus, the path of the optical signal is bent downward toward the optical circuit 2A and the optical signal is again led into the optical circuit 2A and transmitted therein.

When direct voltage is applied between the upper electrode 6 and the lower electrode 7, because the active core layer 1 exhibits an electro-optical effect, the refractive index n1 changes in accordance with the voltage, and thus, the phase of the optical signal transmitted in the active core layer 1 also changes. Accordingly, by applying electric voltages of different voltages to one of the upper electrodes 6, the intensity of the output signal led out the optical device 100 can be modulated to from 0% to 100% of the intensity of the input optical signal. Consequently, the optical device 100 can be used as an optical switch or an optical modulator.

In the optical device 100, the optical circuit 2A through which the optical signal is transmitted has the refractive index n2 which is lower than the refractive index n1 of the active core layer 1. Accordingly, the optical device 100 has a lower coupling and propagation loss between the active core 1 and the optical circuit 2A compared with a conventional optical device.

2. Second Embodiment

An optical device of a second embodiment of the present invention is described below.

Figure 4A:
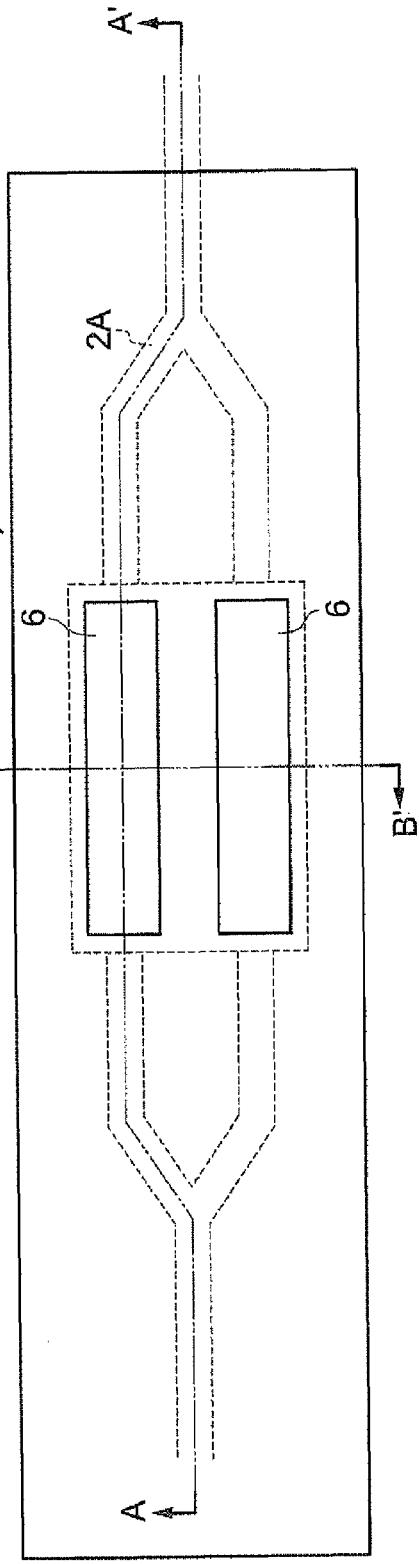
FIG. 4A is a plan view of an optical device of a second embodiment and FIG. 4B is a sectional view thereof sectioned along line A-A'.
Figure 4B:
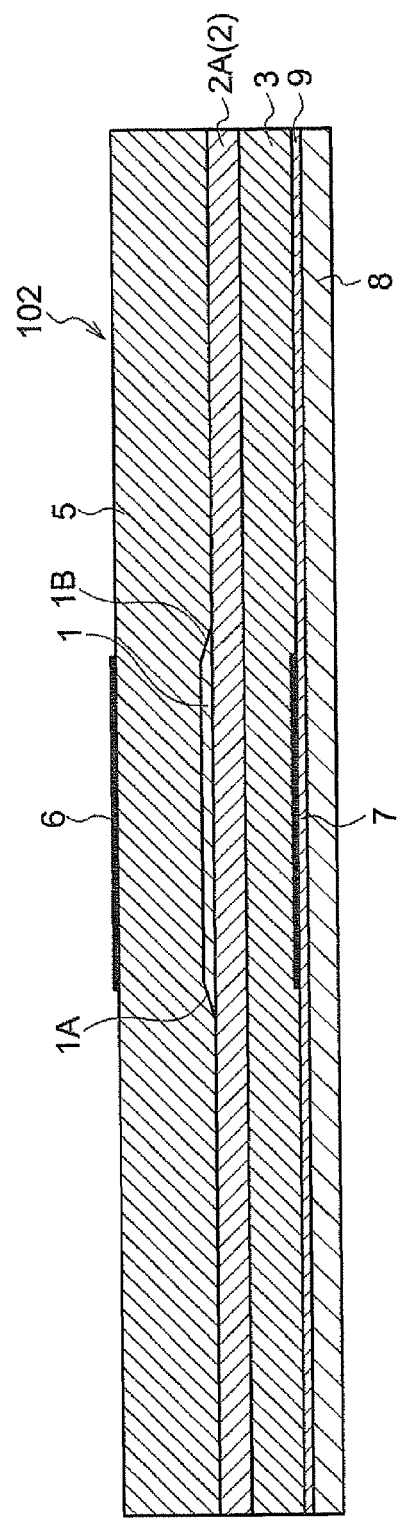

FIG. 4A is a plan view of the optical device 102 of the second embodiment and FIG. 4B is a sectional view thereof sectioned along line A-A' in FIG. 1A. In FIGS. 4A to 13B, numerical references that are the same as those in FIGS. 1A to 3 indicate the same components, respectively.

Figure 5:
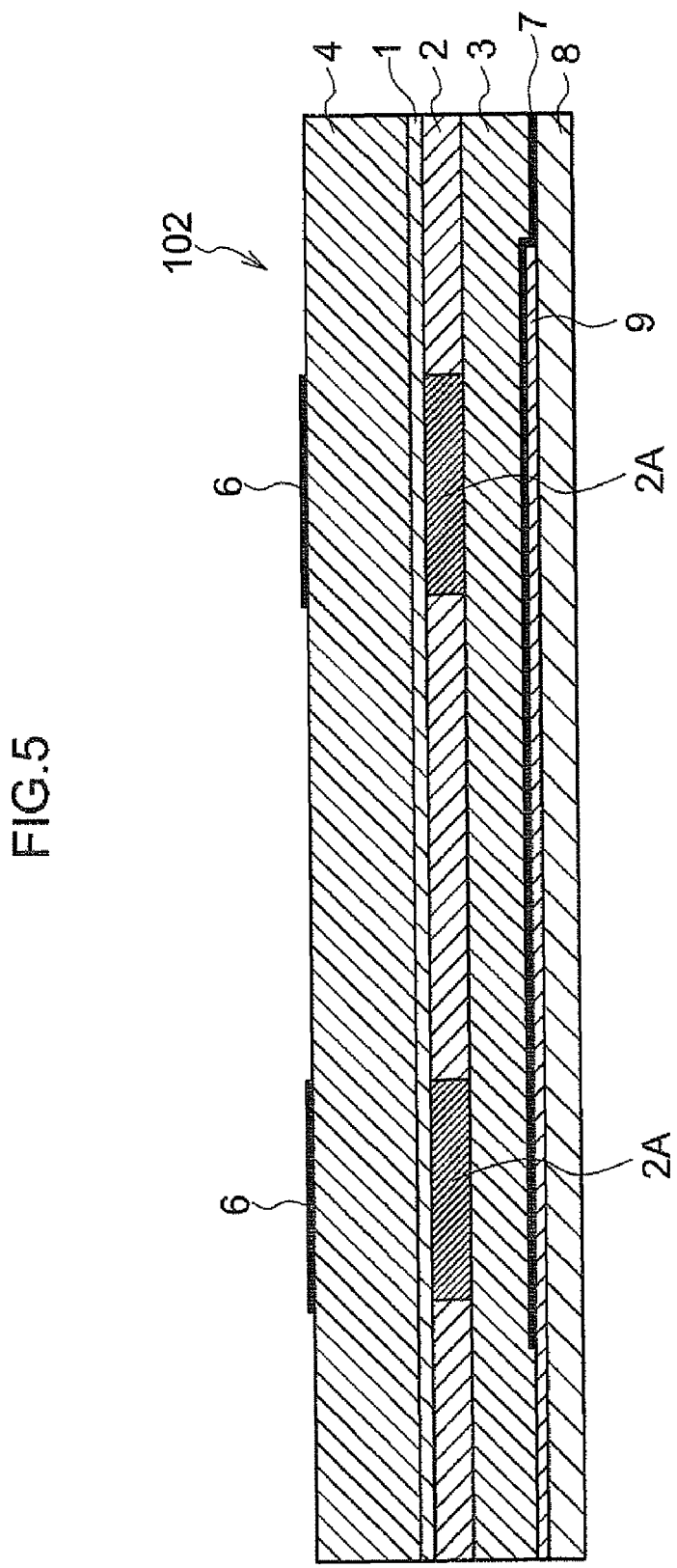
FIG. 5 is a sectional view of the optical device of the second embodiment along line B-B' in FIG. 4.

As shown in FIGS. 4A, 4B, and 5, in the optical device 102, the active core layer 1 is disposed directly on the passive core layer 2 and the optical circuit 2A and whole area of the active core layer 1 is covered by the upper clad layer 5 but the upper buffer layer 4 is not provided.

As shown in FIG. 4B, the entrance portion 1A and the exit portion 1B of the active core layer 1 are tapered, respectively Except for in the above respects, the elements and the configuration of the optical device 102 are the same as those in the optical device 100 of the first embodiment.

The optical device 102 can be produced by the process shown in FIGS. 20A to 22B.

Figure 20A:
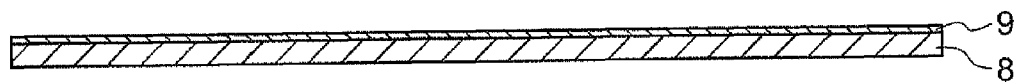
FIG. 20A to FIG. 20D are process charts showing the initial part of a process for producing the optical device of the second embodiment.
Figure 20B:
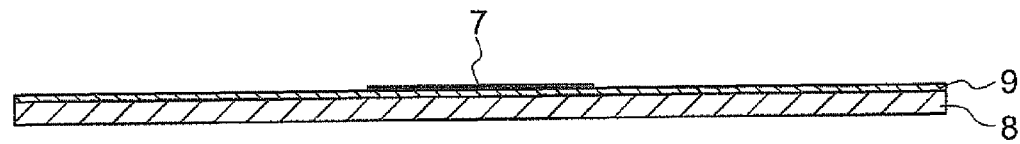
Figure 20C:
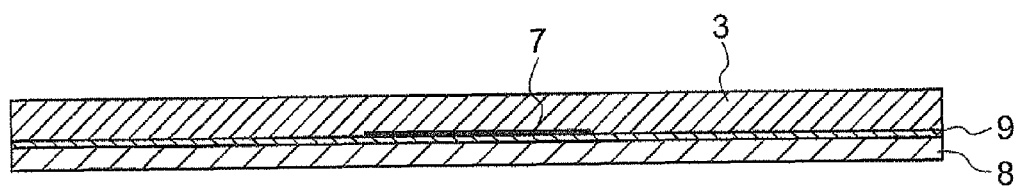
Figure 20D:
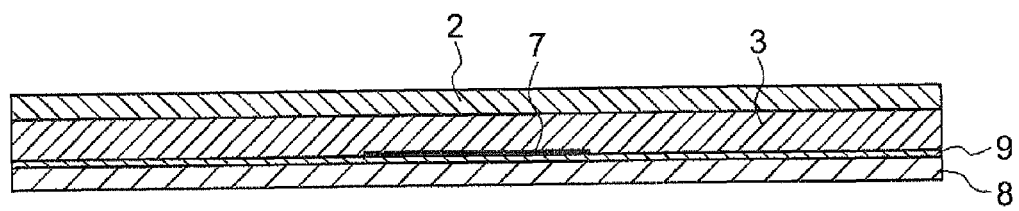

Firstly, the lower buffer layer 9 is formed over the substrate 8 (FIG. 20A), and the lower electrode 7 is formed on the lower buffer layer 9 (FIG. 20B). Then, the lower buffer layer 9 and the lower electrode 7 are covered by the lower clad layer 3 (FIG. 20C) and the passive core layer 2 is formed over the lower clad layer 3 (FIG. 20D).

Figure 21A:
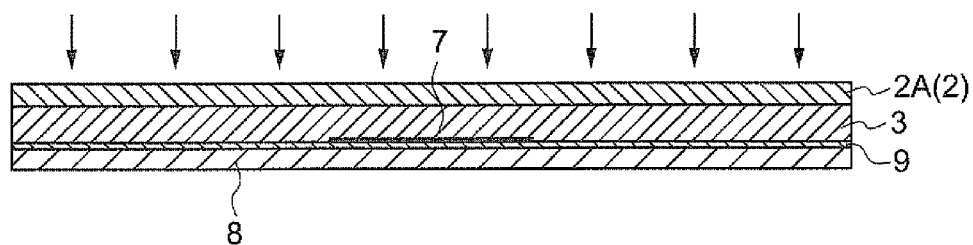
FIG. 21A to FIG. 21C are process charts showing the intermediate part of the process for producing the optical device of the second embodiment.
Figure 21B:
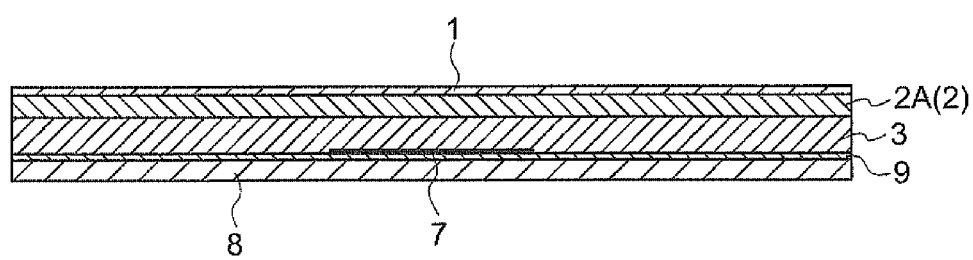
Figure 21C:
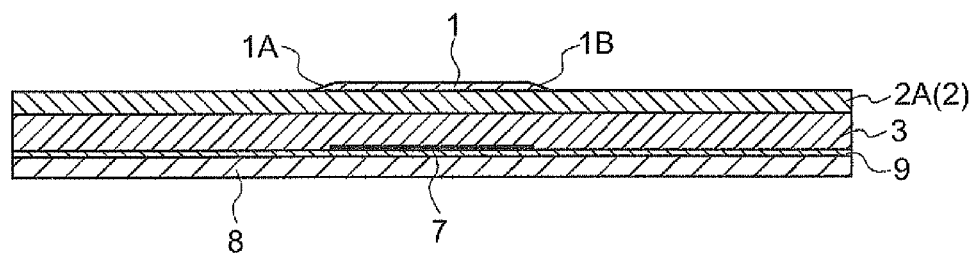

Then, the passive core layer 2 is exposed in a predetermined pattern to form the optical circuit 2A (FIG. 21A). After the optical circuit 2A is formed in the passive core layer 2, the active core layer 1 is formed over the passive core layer 2 and the optical circuit 2A (FIG. 21B). Then, both ends of the active core layer 1 are tapered to form the entrance portion 1A and the exit portion 1B (FIG. 21C).

Figure 22A:
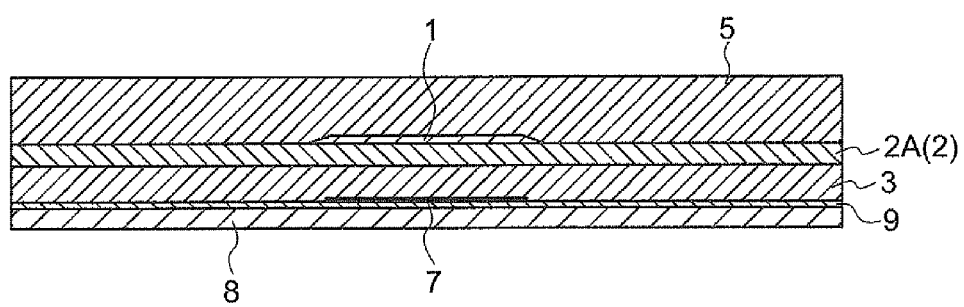
FIG. 22A and FIG. 22B are process charts showing the end part of the process for producing the optical device of the second embodiment.
Figure 22B:
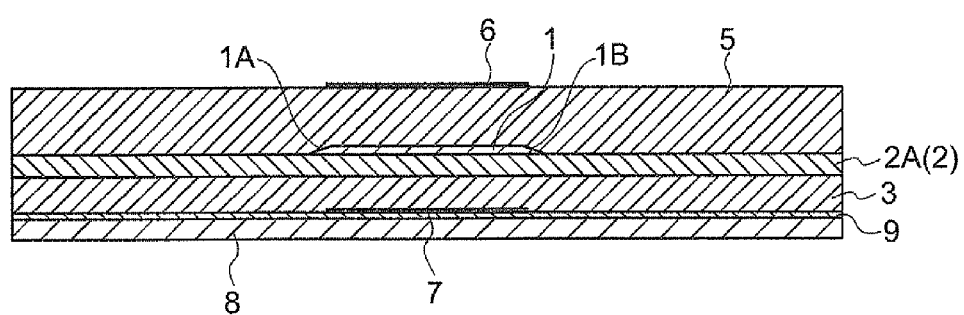

Then, the upper core layer 5 is formed so as to cover the passive core layer 2 and the active core layer 1 (FIG. 22A), and then, the upper electrode 6 is formed on the upper clad layer 5 (FIG. 22B).

Then, the obtained multi-layer structure is heated so that the active core layer 1 is molten or softened, and high direct voltage is applied between the upper electrode 6 and the lower electrode 7. While applying direct voltage between the upper electrode 6 and the lower electrode 7, the obtained multi-layer structure is left to be cooled to room temperature so as to polarize the active core layer 1.

The operation of the optical device 102 is described below.

As shown in FIG. 6, an optical signal led into the optical circuit 2A is transmitted in the optical circuit 2A because the optical circuit 2A has the refractive index n2 that is higher than the refractive index of the passive core layer 2 outside the optical circuit 2A, the refractive index n3 of the lower clad layer 3 and the refractive index n5 of the upper clad layer 5.

At the entrance portion 1A of the active core layer 1, because the refractive index n1 of the active core layer 1 is higher than the refractive index n2 of the optical circuit 2A and the refractive index n5 of the upper clad layer 5, the optical signal is transmitted slower in the active core layer 1 compared with the optical circuit 2A and the upper clad layer 5. Therefore, the path of the optical signal is bent into the active core layer 1 and the optical signal is led into the active core layer 1.

At the outlet portion 1B of the active core layer, the optical signal is transmitted faster in the optical circuit 2A than in the active core layer 1, and thus, the path of the optical signal is bent downward toward the optical circuit 2A and the optical signal is led into the optical circuit 2A and transmitted therein.

When direct voltage is applied between the upper electrode 6, the optical device 102 functions in a similar way as that of the optical device 100 of the first embodiment, and consequently, the optical device 102 can be used as an optical switch or an optical modulator.

3. Third Embodiment

An optical device of a third embodiment of the present invention is described below.

FIG. 7A is a plan view of the optical device 104 of the third embodiment and FIG. 7B is a sectional view thereof sectioned along line A-A' in FIG. 7A.

As shown in FIGS. 7A, 7B, and 8, in the optical device 104, the active core layer 1 is formed in the same layer of the passive core layer 2 and constitutes a portion of the optical circuit 2A. The active core layer 1 is covered by the upper clad layer 5.

As shown in FIG. 7B, the portions of the passive core layer 2 adjacent to the entrance portion 1A and the exit portion 1B of the active core layer 1 are tapered to form tapered portions 20A and 20B.

Except for in the above respects, the elements and the configuration of the optical device 104 are the same as those in the optical device 100 of the first embodiment.

The optical device 104 can be produced by the process shown in FIGS. 23A to 25C.

Figure 23A:
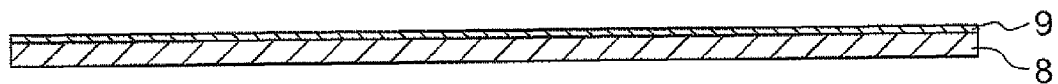
FIG. 23A to FIG. 23D are process charts showing the initial part of a process for producing the optical device of the third embodiment.
Figure 23B:
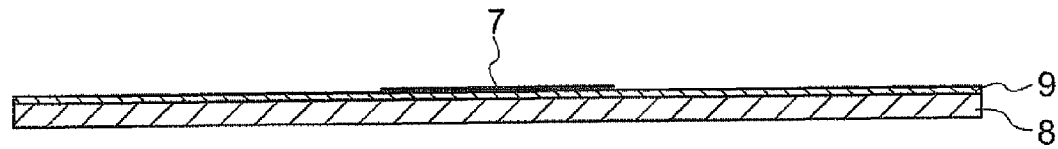
Figure 23C:
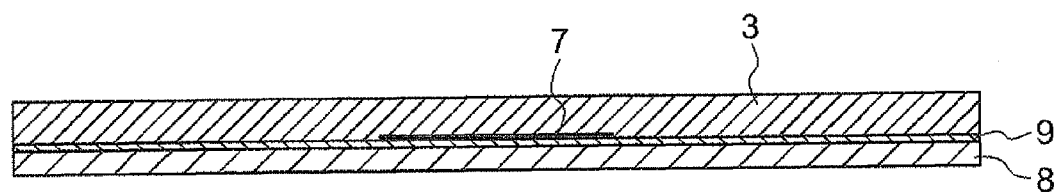
Figure 23D:
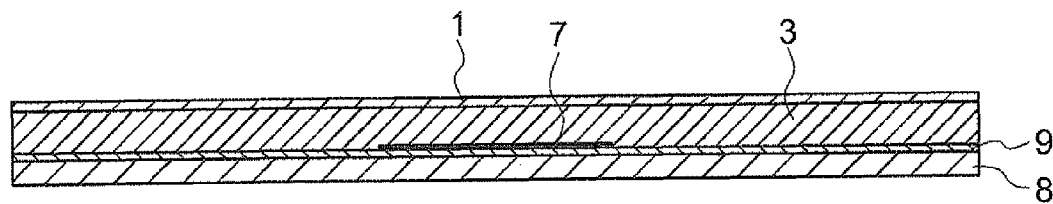

Firstly, the lower buffer layer 9 is formed over the substrate 8 (FIG. 23A), and the lower electrode 7 is formed on the lower buffer layer 9 (FIG. 23B). Then, the lower buffer layer 9 and the lower electrode 7 are covered by the lower clad layer 3 (FIG. 23C) and the active core layer 1 is formed over the lower clad layer 3 (FIG. 23D).

Figure 24A:
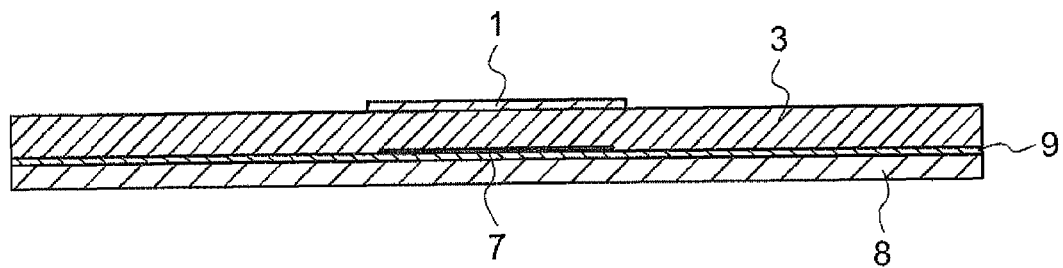
FIG. 24A to FIG. 24C are process charts showing the intermediate part of the process for producing the optical device of the third embodiment.
Figure 24B:
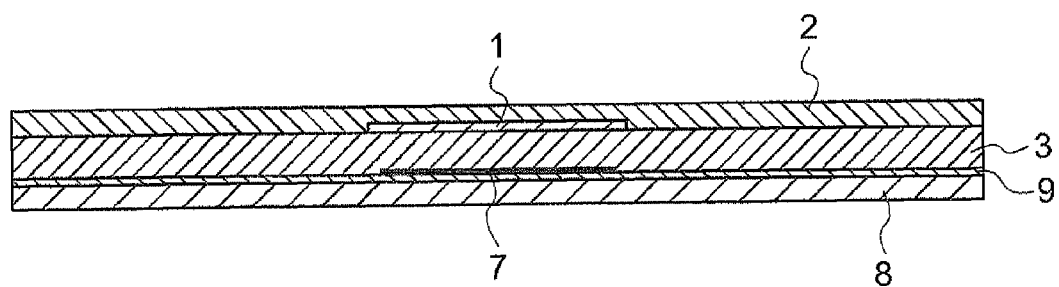
Figure 24C:
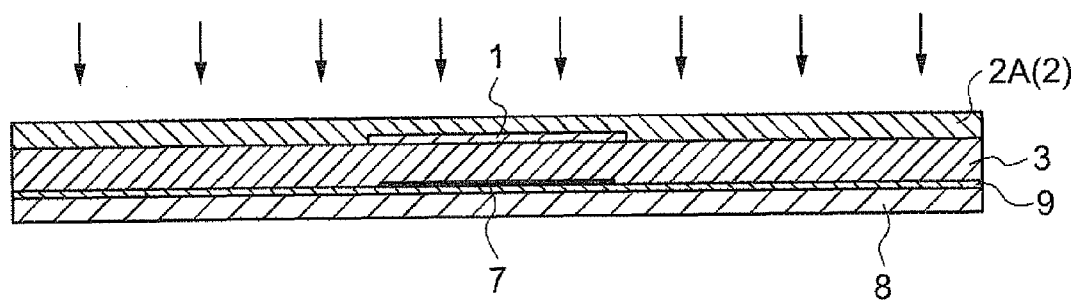

Then, the active core layer 1 is etched (FIG. 24A), and then, the passive core layer 2 is formed over the active core layer 1 and the lower clad layer 3 (FIG. 24B). The passive core layer 2 is exposed in a predetermined pattern to form the optical circuit 2A (FIG. 24C).

Figure 25A:
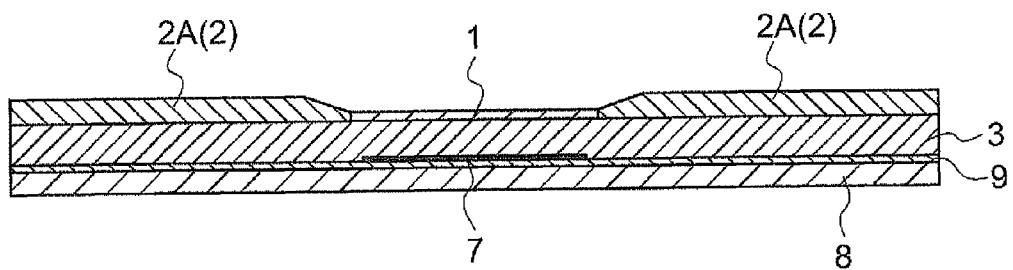
FIG. 25A to FIG. 25C are process charts showing the end part of the process for producing the optical device of the third embodiment.
Figure 25B:
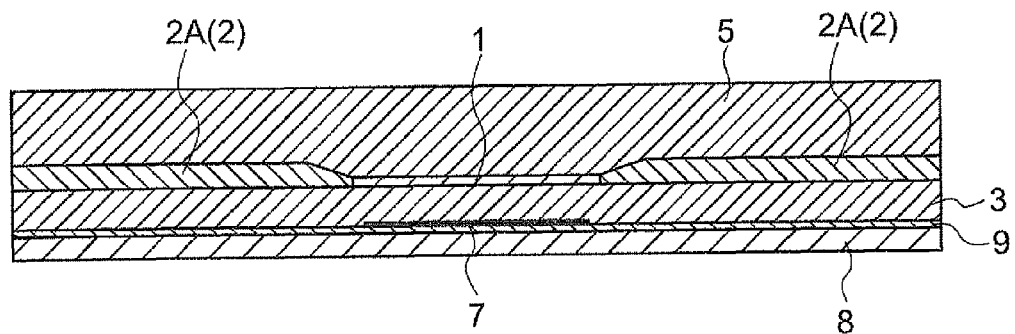
Figure 25C:
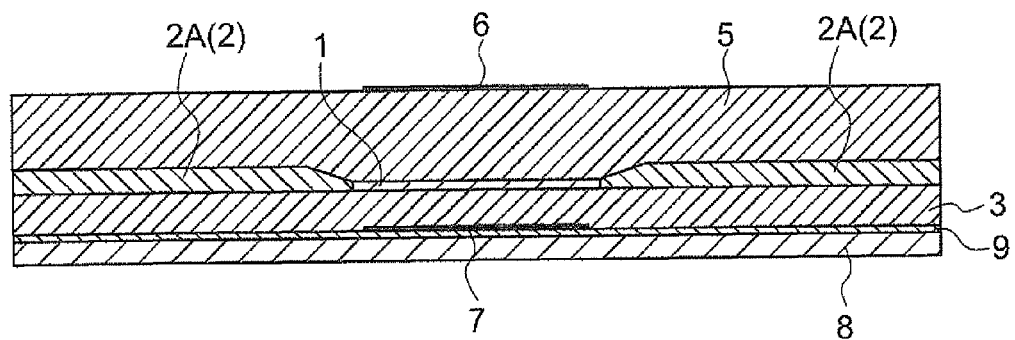

Then, the passive core layer 2 and the optical circuit 2A is etched to expose the active core layer 1 (FIG. 25A). After the passive core layer 2 and the optical circuit 2A is etched, the upper clad layer 5 is formed over the passive core layer 2, the optical circuit 2A, and the active core layer 1 (FIG. 25B). Then, the upper electrode 6 is formed on the upper clad layer 5 (FIG. 25C).

Then, the obtained multi-layer structure is heated so that the active core layer 1 is molten or softened, and high direct voltage is applied between the upper electrode 6 and the lower electrode 7. While applying direct voltage between the upper electrode 6 and the lower electrode 7, the obtained multi-layer structure is left to be cooled to room temperature so that the active core layer 1 is polarized.

The operation of the optical device 104 is described below.

As shown in FIG. 9, an optical signal led into the optical circuit 2A is transmitted in the optical circuit 2A because the optical circuit 2A has the refractive index n2 that is higher than the refractive index of the passive core layer 2 outside the optical circuit 2A, the refractive index n3 of the lower clad layer 3 and the refractive index n5 of the upper clad layer 5.

At the entrance portion 1A of the active core 1, the optical signal transmitted in the optical circuit 2A is led into the active core layer 1 and then is transmitted in the active core layer 1.

At the outlet portion 1B of the active core layer 1, the optical signal is led into the optical circuit 2A and then transmitted in the optical circuit 2A.

When direct voltage is applied between the upper electrode 6 and the lower electrode 7, the optical device 104 functions in a similar way as the optical device 100 of the first embodiment, and consequently, the optical device 104 can be used as an optical switch or an optical modulator.

4. Fourth Embodiment

An optical device of a fourth embodiment of the present invention is described below.

FIG. 10A is a plan view of the optical device 106 of the fourth embodiment and FIG. 10B is a sectional view thereof sectioned along line A-A' in FIG. 10A.

As shown in FIGS. 10A, 10B, and 11, in the optical device 106, the active core layer 1 is formed in the same layer of the passive core layer 2 and constitutes a portion of the optical circuit 2A. The active core layer 1 is covered by the optical circuit 2A.

Except for in the above respects, the elements and the configuration of the optical device 106 are the same as those in the optical device 104 of the third embodiment.

Optical device 106 can be formed by the same process described in the fourth embodiment except that the optical circuit 2A and the passive core layer 2 is etched so that the optical circuit 2A remains over the active core layer 1.

The operation of the optical device 106 is described below.

As shown in FIG. 12, an optical signal led into the optical circuit 2A is transmitted in the optical circuit 2A because the optical circuit 2A has the refractive index n2 that is higher than the refractive index of the passive core layer 2 outside the optical circuit 2A, the refractive index n3 of the lower clad layer 3 and the refractive index n5 of the upper clad layer 5.

At the entrance portion 1A of the active core 1, since the refractive index n1 of the active core layer 1 is higher than the refractive index n2 of the optical circuit 2A, the path of the optical signal is bent downward toward the active core layer 1, and thus, the optical signal is led into the active core layer 1, and then, is transmitted in the active core layer 1.

At the outlet portion 1B of the active core layer 1, the optical signal is again led into the optical circuit 2A, and then, transmitted in the optical circuit 2A.

When direct voltage is applied between the upper electrode 6 and the lower electrode 7, the optical device 106 functions in a similar way as that of the optical device 100 of the first embodiment, and consequently, the optical device 106 can be used as an optical switch or an optical modulator.

5. Fifth Embodiment

An optical device of a fifth embodiment of the present invention is described below.

FIG. 13A is a plan view of the optical device 108 of the fifth embodiment and FIG. 13B is a sectional view thereof sectioned along line A-A' in FIG. 13A.

As shown in FIGS. 13A and 13B, in the optical device 108, the optical circuit 2A includes a multimode wave guide 24, an inlet single mode wave guide 22 connected to entrance portion of the multimode wave guide 24, and an outlet single mode wave guide 26 connected to exit portion of the multimode wave guide 24. The upper electrode 6 is formed over the multimode wave guide 24. The width W of the multimode wave guide 24 is typically 5 times or more, preferably 10 to 100 times, more preferably 10 to 50 times larger than the width w of the single mode wave guides 22 and 26. The single mode wave guides 22 and 26 can have the same width.

Except for in the above respects, the elements and the configuration of the optical device 108 are the same as those in the optical device 100 of the first embodiment. The optical device 108 can be produced by a similar process as that of the optical device 100 of the first embodiment.

The operation of the optical device 108 is described below.

An optical signal led into the inlet single mode wave guide 22 is transmitted in a single mode. At the entrance of the multimode wave guide 24, the optical signal is dispersed into a multimode and led into the multimode wave guide 24, and then, at the entrance portion 1A of the active core layer 1, the optical signal, which is in the multimode, is led into the active core layer 1 and transmitted therein. At the exit portion 1B of the active core layer, the multimode optical signal returns to the multimode wave guide 24. At the exit of the multimode wave guide 24, the multimode optical signal is converged into a single mode optical signal and then transmitted in the outlet single mode wave guide 26.

Consequently, at the conjunction of the inlet single mode wave guide 22 and the multimode wave guide 24, and at the conjunction of the multimode wave guide 24 and the outlet single mode wave guide 26, optical signal interference and a bright light spot is generated at each conjunction of the multimode wave guide 24 as shown in FIG. 13.

When a direct voltage is applied to the upper electrode 6, the refractive index n1 of the active core layer 1 changes according to the voltage of the direct voltage, and accordingly, the phase of the optical signal transmitted in the active core layer 1 is changed. Thus, the bright light spot at the exit of the multimode wave guide 24 moves to a different location and the intensity of the optical signal output from the outlet single mode wave 26 changes. Accordingly, optical modulation can be carried out by the optical device 108 of the fifth embodiment.

6. Sixth Embodiment

A multiple beam scanner of a sixth embodiment of the present invention is described below.

As shown in FIG. 14, the multiple beam scanner 200 is a scanner for scanning a photosensitive drum 300 of an electrophotographic image forming apparatus such as a photocopier or a laser printer, and includes a plurality of electro-optical shutter units 210 and a driving circuit 220 driving each of the electro-optical shutter units 210 in accordance with image data input by a computer (not shown).

As shown in FIG. 15, each of the electro-optical shutter units 210 comprises a laser diode 212 corresponding to the light source of the present invention, two optical power splitters 214 splitting the light emitted by the laser diode 212, a photo coupler 216 connecting the laser diode 212 and the optical power splitters 214, a group of optical devices 108 respectively connected with each optical power splitter 214 and driven by the driving circuit 220, and a micro lens 218 focusing light emitted from the optical devices 108. The driving circuit 220 is connected with the upper electrode 6 of each optical device 108. The electro-optical shutter unit 210 also includes a photodiode 211 monitoring the laser diode 212, and a power adjusting circuit 213 carrying out feedback control of the intensity of the light emitted by the laser diode 212 in accordance with the photo intensity detected by the photodiode 211.

Figure 16:
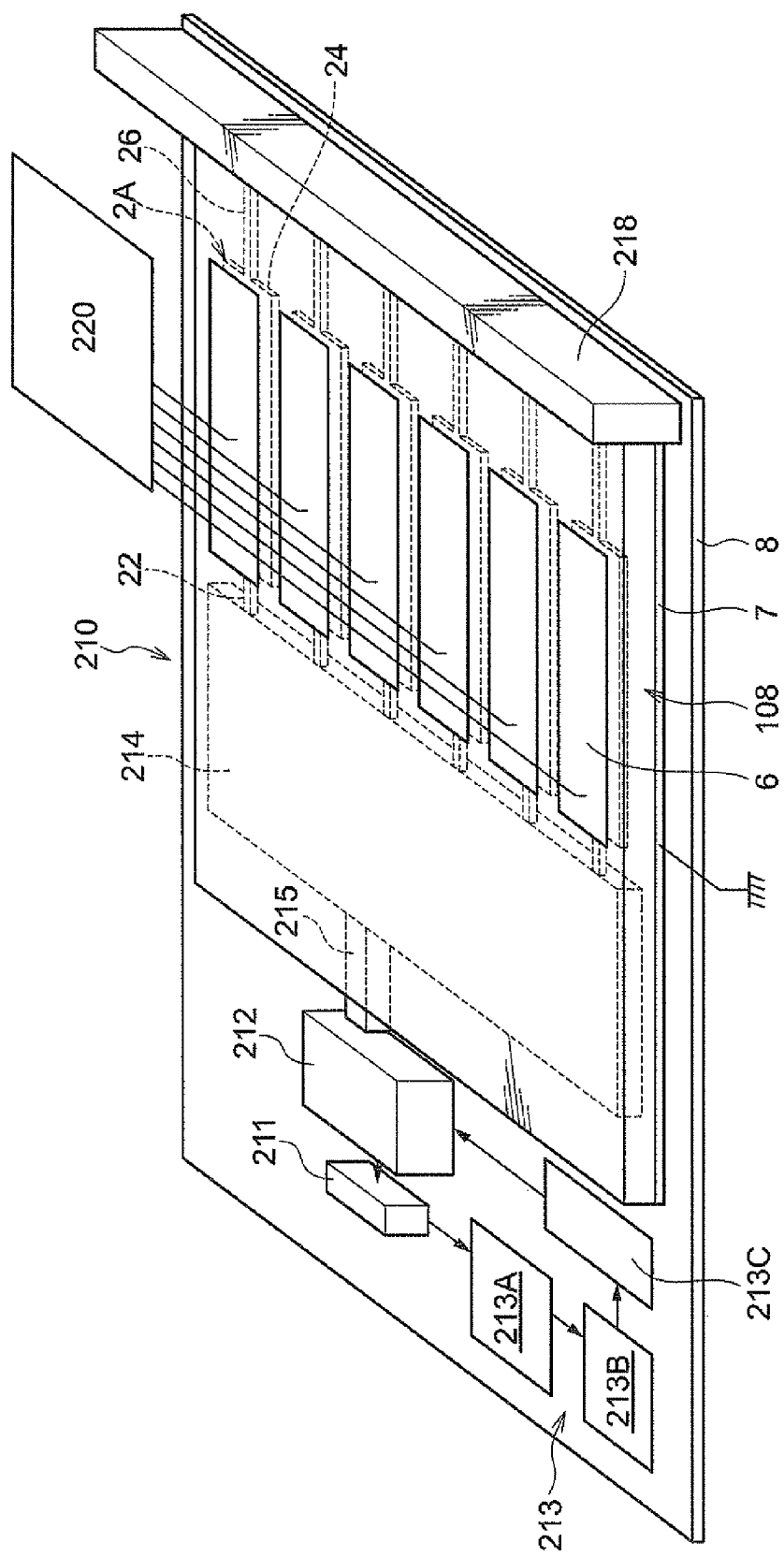
FIG. 16 is a schematic view showing another example of a configuration of the electro-optical scanning unit of the multi beam scanner of a sixth embodiment.

On the other hand, as shown in FIG. 16, the electro-optical shutter unit 210 can includes only one optical device 108 having a plurality of optical circuits 2A and upper electrodes 6 provided above the multimode wave guide 24 of each optical circuit 2A. In the electro-optical shutter unit 210 of FIG. 16, the optical power splitter 214 is connected with the laser diode 212 directly by a single mode wave guide 215.

The power adjusting circuit 213 includes a power supply circuit 213C supplying power to the laser diode 212, a power adjustment circuit 213B controlling the power supply circuit 213C, a power feedback circuit 213A carrying out feedback control of the power adjustment circuit 213B in accordance with photo-intensity detected by the photodiode 211 so that light of a constant power is emitted by the laser diode 212.

Optical circuit 2A comprises an inlet single mode wave guide 22, the multimode wave guide 24, and the outlet single mode wave guide 26.

In the optical device 108, each upper electrode 6 is connected with the driving circuit 220 and the lower electrode 7 is earthed.

Light from the laser diode 212 is split by the optical power splitter 214 into plural light beams and led into one end of the optical circuit 2A of each optical device 108. In accordance with the voltage applied to the upper electrode 6 by the driving circuit 220, light from the other end of the optical circuit 2A is emitted or not emitted. The light emitted from the optical circuit 2A is focused on the photosensitive drum 300 by the micro mirror 218. Thus, the multi beam scanner 200 functions as an electro-optical shutter scanning the photosensitive drum 300 electro-optically.

In a conventional Raster output scanner (ROS) used in a laser printer or a photocopier, a polygon mirror rotating around an axis is disposed for scanning a laser beam. However, for increasing resolution and image-forming speed in a conventional ROS, the polygon mirror is necessarily rotated faster. Thus, resolution and image-forming speed of a laser printer or a photocopier is limited by mechanical limits of the polygon mirror and a rotating portion rotating the polygon mirror, and by vibrations caused by rotation of the polygon mirror at high rotation speeds. This is usually the cause of reduced image quality in high speed mechanical scanning.

On the other hand, in the multiple beam scanner 200 of the sixth embodiment, the photo-sensitive drum 300 is scanned by turning on and turning off the plural optical devices 108 in turn. Accordingly, there is no mechanical or vibration limitation of resolution and image-forming speed in a laser printer or a photocopier having the multiple beam scanner 200.

A first aspect of the present invention relates to an optical device including: a passive core layer in which is formed an optical circuit having a refractive index n2 that is higher than the refractive index of the other portions of the passive core layer; an active core layer covering at least a portion of the optical circuit, exhibiting an electro-optical effect, and having a refractive index of n1 that is higher than the refractive index n2 of the optical circuit; a lower clad layer over which the passive core layer is formed and having a refractive index n3 that is lower than the refractive index n2 of the optical circuit; an upper clad layer covering the active and passive core layers and having a refractive index n5 that is lower than the refractive index n1 of the active core layer; a lower electrode disposed below the lower clad layer; and an upper electrode disposed on the upper clad layer, entrance and exit portions of the active core layer being tapered, respectively.

A second aspect of the present invention relates to an optical device including: a passive core layer in which is formed an optical circuit having a refractive index n2 that is higher than the refractive index of the other portions of the passive core layer; an active core layer covering at least a portion of the optical circuit, exhibiting an electro-optical effect, and having a refractive index of n1 that is higher than the refractive index n2 of the optical circuit; a lower clad layer over which the passive core layer is formed and having a refractive index n3 that is lower than the refractive index n2 of the optical circuit; an upper clad layer covering the passive core layer and having a refractive index n5 that is lower than the refractive index n1 of the active core layer; an upper buffer layer covering the active core layer and having a refractive index n4 that is lower than the refractive index n1 of the active core layer and lower than or equal to the refractive index n5 of the upper clad layer; a lower electrode disposed below the lower clad layer; and an upper electrode disposed on the upper buffer layer, entrance and exit portions of the active core layer being tapered, respectively, and a taper structure is formed on the upper clad layer, the active core layer is formed at the bottom of the tapered structure, and the upper buffer layer is disposed so as to fill the remaining portions of the tapered structure.

A third aspect of the present invention relates to an optical device including: a passive core layer in which is formed an optical circuit having a refractive index n2 that is higher than the refractive index of the other portions of the passive core layer; an active core layer covering at least a portion of the optical circuit, exhibiting an electro-optical effect, and having a refractive index of n1 that is higher than the refractive index n2 of the optical circuit; a lower clad layer over which the passive core layer is formed and having a refractive index n3 that is lower than the refractive index n2 of the optical circuit; an upper clad layer covering the active and passive core layers and having a refractive index n5 that is lower than the refractive index n1 of the active core layer; a lower electrode disposed below the lower clad layer; and an upper electrode disposed on the upper clad layer, the portions of the optical circuit adjacent to entrance and exit portions of the active core layer being tapered, respectively.

According to the above aspects 1 to 3, an optical device having a lower coupling and propagation loss between the core and an inlet or outlet optical wave guide compared with a conventional optical device is provided.

A fourth aspect of the present invention relates to the optical device of one of the aspects 1 to 3, wherein the optical circuit is a Mach-Zender type optical modulating circuit.

According to the fourth aspect, an optical device having a lower coupling and propagation loss between the core and an inlet or outlet optical wave guide compared with a conventional optical device with a Mach-Zender type optical circuit is provided.

A fifth aspect of the present invention relates to the optical device of one of the first to third aspects, wherein the optical circuit comprises a multimode wave guide, an inlet single mode wave guide connected to the entrance portion of the multimode wave guide, and an outlet single mode wave guide connected to the exit portion of the multimode wave guide.

According to the fifth aspects, an optical device having a simpler and more robust optical circuit compared with an optical device having a Mach-Zender optical circuit is provided.

A sixth aspect of the present invention relates to a multiple beam scanner for scanning a photo-sensitive drum of an image-forming apparatus comprising: a light source emitting light; an optical power splitter splitting the light emitted by the light source into a plurality of light beams; and the optical devices of one of the first to fifth aspects that modulates each of the light beams split by the optical power splitter.

By the sixth aspect, a multiple beam scanner that can scan a photosensitive drum faster than a conventional multiple beam scanner having a polygon mirror rotating around an axis is provided.

The foregoing description of the exemplary embodiments of the present invention has been provided for the purpose of illustration and description. It is not intended to be exhaustive or to limit the invention to the precise forms disclosed. Obviously, many modification and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An optical device comprising:
a passive core layer in which is formed an optical circuit having a refractive index n2 that is higher than the refractive index of other portions of the passive core layer;
an active core layer covering at least a portion of the optical circuit, exhibiting an electro-optical effect, and having a refractive index of n1 that is higher than the refractive index n2 of the optical circuit;
a lower clad layer having a planar top surface which is adjacent to a bottom surface of the passive core layer, the lower clad layer not extending past the bottom surface of the passive core layer and having a refractive index n3 that is lower than the refractive index n2 of the optical circuit;
an upper clad layer covering the active and passive core layers and having a refractive index n5 that is lower than the refractive index n1 of the active core layer;
a lower electrode disposed below the lower clad layer; and
an upper electrode disposed on the upper clad layer,
entrance and exit portions of the active core layer being tapered, respectively.

2. An optical device comprising:
a passive core layer in which is formed an optical circuit having a refractive index n2 that is higher than the refractive index of other portions of the passive core layer;
an active core layer covering at least a portion of the optical circuit, exhibiting an electro-optical effect, and having a refractive index of n1 that is higher than the refractive index n2 of the optical circuit;
a lower clad layer having a planar top surface which is adjacent to a bottom surface of the passive core layer, the lower clad layer not extending past the bottom surface of the passive core layer and having a refractive index n3 that is lower than the refractive index n2 of the optical circuit;
an upper clad layer covering the passive core layer and having a refractive index n5 that is lower than the refractive index n1 of the active core layer;
an upper buffer layer covering the active core layer and having a refractive index n4 that is lower than the refractive index n1 of the active core layer and lower than or equal to the refractive index n5 of the upper clad layer;
a lower electrode disposed below the lower clad layer; and
an upper electrode disposed on the upper buffer layer,
entrance and exit portions of the active core layer being tapered, respectively, and a taper structure is formed on the upper clad layer, the active core layer is formed at the bottom of the tapered structure, and the upper buffer layer is disposed so as to fill the remaining portions of the tapered structure.

3. An optical device comprising:
a passive core layer in which is formed an optical circuit having a refractive index n2 that is higher than the refractive index of other portions of the passive core layer;
an active core layer covering at least a portion of the optical circuit, exhibiting an electro-optical effect, and having a refractive index of n1 that is higher than the refractive index n2 of the optical circuit;
a lower clad layer having a planar top surface which is adjacent to a bottom surface of the passive core layer, the lower clad layer not extending past the bottom surface of the passive core layer and having a refractive index n3 that is lower than the refractive index n2 of the optical circuit;
an upper clad layer covering the active and passive core layers and having a refractive index n4 that is lower than the refractive index n1 of the active core layer;
a lower electrode disposed below the lower clad layer; and
an upper electrode disposed on the upper clad layer,
portions of the optical circuit adjacent to entrance and exit portions of the active core layer being tapered, respectively.

4. The optical device of claim 1, wherein the optical circuit is a Mach-Zender type optical modulating circuit.

5. The optical device of claim 2, wherein the optical circuit is a Mach-Zender type optical modulating circuit.

6. The optical device of claim 3, wherein the optical circuit is a Mach-Zender type optical modulating circuit.

7. The optical device of claim 1, wherein the optical circuit comprises a multimode wave guide, an inlet single mode wave guide connected to the entrance portion of the multimode wave guide, and an outlet single mode wave guide connected to the exit portion of the multimode wave guide.

8. The optical device of claim 2, wherein the optical circuit comprises a multimode wave guide, an inlet single mode wave guide connected to the entrance portion of the multimode wave guide, and an outlet single mode wave guide connected to the exit portion of the multimode wave guide.

9. The optical device of claim 3, wherein the optical circuit comprises a multimode wave guide, an inlet single mode wave guide connected to the entrance portion of the multimode wave guide, and an outlet single mode wave guide connected to the exit portion of the multimode wave guide.

10. A multiple beam scanner for scanning a photo-sensitive drum of an image-forming apparatus comprising:
   a light source emitting a light;
   an optical power splitter splitting the light emitted by the light source into a plurality of light beams; and
   the optical device of claim 1 that modulates each of the light beams split by the optical power splitter.

11. A multiple beam scanner for scanning a photo-sensitive drum of an image-forming apparatus comprising:
   a light source emitting a light;
   an optical power splitter splitting the light emitted by the light source into a plurality of light beams; and
   the optical device of claim 2 that modulates each of the light beams split by the optical power splitter.

12. A multiple beam scanner for scanning a photo-sensitive drum of an image-forming apparatus comprising:
   a light source emitting a light;
   an optical power splitter splitting the light emitted by the light source into a plurality of light beams; and
   the optical device of claim 3 that modulates each of the light beams split by the optical power splitter.

* * * * *